(12) United States Patent
Eisenfeld et al.

(10) Patent No.: US 11,796,729 B2
(45) Date of Patent: Oct. 24, 2023

(54) OPTICAL APERTURE MULTIPLIERS HAVING A RECTANGULAR WAVEGUIDE

(71) Applicant: Lumus Ltd., Ness Ziona (IL)

(72) Inventors: Tsion Eisenfeld, Ashkelon (IL); Yochay Danziger, Kfar Vradim (IL); Eitan Ronen, Rehovot (IL); Ronen Chriki, Lod (IL); Mordechai Gilo, Rehovot (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 4 days.

(21) Appl. No.: 18/027,105

(22) PCT Filed: Feb. 24, 2022

(86) PCT No.: PCT/IL2022/050216
§ 371 (c)(1),
(2) Date: Mar. 19, 2023

(87) PCT Pub. No.: WO2022/180634
PCT Pub. Date: Sep. 1, 2022

(65) Prior Publication Data
US 2023/0228932 A1   Jul. 20, 2023

Related U.S. Application Data

(60) Provisional application No. 63/297,299, filed on Jan. 7, 2022, provisional application No. 63/153,433, filed on Feb. 25, 2021.

(51) Int. Cl.
*F21V 8/00* (2006.01)

(52) U.S. Cl.
CPC ......... *G02B 6/0028* (2013.01); *G02B 6/0055* (2013.01)

(58) Field of Classification Search
None
See application file for complete search history.

(56) References Cited

U.S. PATENT DOCUMENTS

| 2,748,659 A | 6/1956 | Geffcken et al. |
| 2,795,069 A | 6/1957 | Hardesty |

(Continued)

FOREIGN PATENT DOCUMENTS

| CN | 101542346 | 9/2009 |
| CN | 205787362 U | 12/2016 |

(Continued)

OTHER PUBLICATIONS

Mukawa et al. A full-color eyewear display using planar waveguides with reflection volume holograms. Journal of The Society for Information Display—J Soc Inf Disp. Mar. 17, 2009. 10.1889/JSID17.3.185-187 Mar. 31, 2009 (Mar. 31, 2009) pp. 285-287, 1-27.

(Continued)

*Primary Examiner* — Jerry Rahll
(74) *Attorney, Agent, or Firm* — Mark M. Friedman

(57) ABSTRACT

An optical device includes a first waveguide, having parallel first and second faces and parallel third and fourth faces forming a rectangular cross-section, that guides light by four-fold internal reflection and is associated with a coupling-out configuration that couples light out of the first waveguide into a second waveguide. The first or second face is subdivided into first and second regions having different optical characteristics. The optical device also includes a coupling-in configuration having a surface that transmits light into the first waveguide. The surface is deployed in association with a portion of the third or fourth face adjoining the second region such that an edge associated with the surface trims an input collimated image in a first dimension, and a boundary between the first and second regions trims the input collimated image in a second dimension to produce (Continued)

a trimmed collimated image that advances by four-fold internal reflection.

17 Claims, 21 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,005,320 A | 4/1991 | Furmanak |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,430,505 A | 7/1995 | Katz |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,712,694 A | 1/1998 | Taira et al. |
| 5,724,163 A | 3/1998 | David |
| 5,745,199 A | 4/1998 | Suzuki et al. |
| 5,751,480 A | 5/1998 | Kitagishi |
| 5,764,412 A | 6/1998 | Suzuki et al. |
| 5,829,854 A | 11/1998 | Jones |
| 5,872,663 A | 2/1999 | Lee et al. |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,154,321 A | 11/2000 | Melville et al. |
| 6,222,676 B1 | 4/2001 | Togino et al. |
| 6,231,992 B1 | 5/2001 | Niebauer et al. |
| 6,239,092 B1 | 5/2001 | Papasso et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,394,607 B1 | 5/2002 | Hashizume et al. |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,847,488 B2 | 1/2005 | Travis |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,405,573 B2 | 3/2013 | Lapidot et al. |
| 8,432,614 B2 | 4/2013 | Amitai |
| 8,548,290 B2 | 10/2013 | Travers et al. |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,913,865 B1 | 12/2014 | Bennett |
| 9,025,253 B2 | 5/2015 | Hadad et al. |
| 9,551,880 B2 | 1/2017 | Amitai |
| 9,625,723 B2 | 4/2017 | Lou et al. |
| 9,791,703 B1 | 10/2017 | Vallius et al. |
| 9,805,633 B2 | 10/2017 | Zheng |
| 9,933,684 B2 | 4/2018 | Brown et al. |
| 10,133,070 B2 * | 11/2018 | Danziger ........... G02B 27/0101 |
| 10,222,535 B2 | 3/2019 | Remhof et al. |
| 10,302,835 B2 | 5/2019 | Danziger |
| 10,437,031 B2 | 10/2019 | Danziger et al. |
| 10,437,066 B2 | 10/2019 | Dobschal |
| 10,437,068 B2 | 10/2019 | Weng et al. |
| 10,480,725 B2 | 11/2019 | Streppel |
| 10,480,772 B2 | 11/2019 | Forest |
| 10,480,775 B2 | 11/2019 | Streppel |
| 10,481,319 B2 | 11/2019 | Danziger et al. |
| 10,678,055 B2 | 6/2020 | Edwin et al. |
| 10,725,291 B2 | 7/2020 | Chi et al. |
| 10,739,512 B2 | 8/2020 | Eisenfeld et al. |
| 10,962,787 B1 | 3/2021 | Lou et al. |
| 10,983,264 B2 | 4/2021 | Danziger et al. |
| 11,009,704 B2 | 5/2021 | Ayres et al. |
| 11,187,902 B2 | 11/2021 | Urness et al. |
| 11,378,391 B2 | 7/2022 | Do et al. |
| 11,561,335 B2 | 1/2023 | Danziger et al. |
| 2001/0000124 A1 | 4/2001 | Kollin et al. |
| 2002/0015233 A1 | 2/2002 | Park |

(56) References Cited

U.S. PATENT DOCUMENTS

| | | | |
|---|---|---|---|
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0169504 A1 | 9/2003 | Kaminski et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0008356 A1 | 4/2005 | Yamazaki et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai |
| 2005/0265044 A1 | 12/2005 | Chen et al. |
| 2006/0126182 A1 | 6/2006 | Levola |
| 2006/0221448 A1 | 10/2006 | Nivon et al. |
| 2006/0268421 A1 | 11/2006 | Shimizu et al. |
| 2007/0070859 A1 | 3/2007 | Hirayama |
| 2007/0086712 A1 | 4/2007 | Shani |
| 2007/0091445 A1 | 4/2007 | Amitai |
| 2007/0097513 A1 | 5/2007 | Amitai |
| 2007/0171329 A1 | 7/2007 | Freeman et al. |
| 2007/0015967 A1 | 12/2007 | Freeman et al. |
| 2008/0094586 A1 | 4/2008 | Hirayama |
| 2008/0151375 A1 | 6/2008 | Lin |
| 2008/0151379 A1 | 6/2008 | Amitai |
| 2008/0278812 A1 | 11/2008 | Amitai |
| 2009/0034069 A1 | 2/2009 | Hsu |
| 2009/0012241 A1 | 5/2009 | Amitai |
| 2009/0122414 A1 | 5/2009 | Amitai |
| 2009/0190222 A1 | 7/2009 | Simmonds et al. |
| 2010/0067110 A1 | 3/2010 | Amitai et al. |
| 2010/0111472 A1 | 5/2010 | DeJong |
| 2010/0201953 A1 | 8/2010 | Freeman |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0096566 A1 | 4/2011 | Tsai et al. |
| 2011/0109880 A1 | 5/2011 | Nummela |
| 2011/0194810 A1 | 8/2011 | Chen et al. |
| 2012/0039576 A1 | 2/2012 | Dangel et al. |
| 2012/0147361 A1 | 6/2012 | Mochizuki et al. |
| 2012/0206817 A1 | 8/2012 | Totani |
| 2013/0021581 A1 | 1/2013 | Takahashi et al. |
| 2013/0135749 A1 | 5/2013 | Akutsu et al. |
| 2013/0208362 A1 | 8/2013 | Bohn et al. |
| 2013/0321432 A1 | 12/2013 | Burns et al. |
| 2013/0334504 A1 | 12/2013 | Thompson et al. |
| 2013/0335975 A1 | 12/2013 | Park |
| 2014/0003762 A1 | 1/2014 | Macnamara |
| 2014/0019801 A1 | 1/2014 | Sutton et al. |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0160529 A1 | 6/2015 | Popovich et al. |
| 2015/0182348 A1 | 7/2015 | Siegal et al. |
| 2015/0219834 A1 | 8/2015 | Nichol et al. |
| 2015/0289762 A1 | 10/2015 | Popovich et al. |
| 2015/0338655 A1 | 11/2015 | Sawada et al. |
| 2016/0007419 A1 | 1/2016 | Lee et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0259167 A1 | 9/2016 | Takagi et al. |
| 2016/0341964 A1 | 11/2016 | Amitai |
| 2017/0075119 A1 | 3/2017 | Schultz |
| 2017/0242249 A1 | 8/2017 | Wall |
| 2017/0285346 A1 | 10/2017 | Pan |
| 2017/0293149 A1 | 10/2017 | Tatsugi |
| 2017/0315358 A1 | 11/2017 | Masuda |
| 2017/0343822 A1 | 11/2017 | Border et al. |
| 2017/0353714 A1 | 12/2017 | Poulad et al. |
| 2017/0371160 A1 | 12/2017 | Schultz |
| 2018/0052277 A1 | 2/2018 | Schowengerdt et al. |
| 2018/0210202 A1* | 7/2018 | Danziger ............... H04N 5/74 |
| 2018/0246333 A1 | 8/2018 | Cheng et al. |
| 2018/0262725 A1 | 9/2018 | Fan |
| 2018/0275409 A1 | 9/2018 | Gao et al. |
| 2018/0284443 A1 | 10/2018 | Matsuki |
| 2018/0284448 A1 | 10/2018 | Matsuki |
| 2018/0321515 A1 | 11/2018 | Cheng et al. |
| 2019/0064518 A1* | 2/2019 | Danziger ............. G02B 6/2786 |
| 2019/0212487 A1 | 7/2019 | Danziger et al. |
| 2019/0293838 A1 | 9/2019 | Haba et al. |
| 2020/0081246 A1 | 3/2020 | Olkkonen et al. |
| 2020/0110211 A1 | 4/2020 | Danziger et al. |
| 2020/0192089 A1 | 6/2020 | Haddick et al. |
| 2020/0209667 A1* | 7/2020 | Sharlin ............. G02F 1/136277 |
| 2020/0278554 A1 | 9/2020 | Schultz et al. |
| 2020/0284967 A1 | 9/2020 | Schowengerdt et al. |
| 2020/0292819 A1 | 9/2020 | Danziger et al. |
| 2020/0310024 A1 | 10/2020 | Danziger et al. |
| 2021/0033774 A1 | 2/2021 | Tanaka |
| 2021/0101245 A1 | 4/2021 | Han et al. |
| 2021/0109278 A1 | 4/2021 | Peroz et al. |
| 2022/0004007 A1 | 1/2022 | Bhakta et al. |
| 2022/0030205 A1 | 1/2022 | Danziger |
| 2022/0066215 A1 | 3/2022 | Nakamura et al. |
| 2022/0082837 A1 | 3/2022 | Cheng et al. |
| 2022/0107499 A1 | 4/2022 | Amitai |
| 2022/0155629 A1* | 5/2022 | Sharlin ............. G02B 27/0172 |
| 2022/0342216 A1 | 10/2022 | Danziger et al. |
| 2022/0357497 A1 | 11/2022 | Ronen et al. |
| 2023/0019309 A1 | 1/2023 | Chriki et al. |

FOREIGN PATENT DOCUMENTS

| | | |
|---|---|---|
| CN | 107238928 | 10/2017 |
| CN | 107941469 A | 4/2018 |
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0566004 | 10/1993 |
| EP | 0399865 | 4/1994 |
| EP | 0543718 | 6/1996 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 1779159 | 5/2007 |
| EP | 2530510 | 12/2012 |
| FR | 2496905 | 6/1982 |
| FR | 2638242 | 4/1990 |
| FR | 2721872 | 1/1996 |
| GB | 2153546 | 8/1985 |
| GB | 2220081 | 12/1989 |
| GB | 2272980 | 6/1994 |
| GB | 2278222 | 11/1994 |
| GB | 2278888 | 12/1994 |
| JP | H0641208 Y2 | 10/1994 |
| JP | 1996313843 | 11/1996 |
| JP | H09304036 | 11/1997 |
| JP | H11173825 A | 7/1999 |
| JP | 2002539498 | 11/2002 |
| JP | 2003140081 | 5/2003 |
| JP | 2003536102 | 12/2003 |
| JP | 2004527801 | 9/2004 |
| JP | 2005084522 | 3/2005 |
| JP | 2006201637 A | 8/2006 |

(56) References Cited

FOREIGN PATENT DOCUMENTS

| | | |
|---|---|---|
| JP | 4394919 B | 1/2010 |
| JP | 2011-028141 | 2/2011 |
| JP | 2012-037761 U | 2/2012 |
| JP | 2012058404 | 4/2014 |
| TW | 201809798 | 3/2018 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2006098809 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 2012/107152 | 8/2012 |
| WO | 2013065656 | 5/2013 |
| WO | 2013175465 | 11/2013 |
| WO | 2015081313 | 6/2015 |
| WO | 2016103251 | 6/2016 |
| WO | 2016132347 | 8/2016 |
| WO | 2015012280 | 3/2017 |
| WO | 2017106873 | 6/2017 |
| WO | 2017199232 | 11/2017 |
| WO | 2019131277 | 7/2019 |
| WO | 2021105982 | 6/2021 |
| WO | 2021152602 | 8/2021 |
| WO | 2021/171289 A | 9/2021 |
| WO | 202191889 | 9/2021 |
| WO | 2021191889 | 9/2021 |
| WO | 2021/220267 | 11/2021 |
| WO | 2021220267 | 11/2021 |
| WO | 2021229563 | 11/2021 |
| WO | 2021/245664 | 12/2021 |

OTHER PUBLICATIONS

INF-GEO4310 2010 Solutions, Geometrical Optics, Part 1, Fritz Albregtsen Dec. 31, 2010 available at https://www.uio.no/studier/emner/matnat/ifi/INF-GEO4310/h10/undervisningsmateriale/solution-geometric-imaging-01.pdf Dec. 31, 2010 (Dec. 31, 2010).

International Commission on Non-Ionizing Radiation Protection "ICNIRP Guidelines for Limiting Exposure to Time-Varying Electric, Magnetic and Electromagnetic Fields (Up to 300 Ghz)" Published In: Health Physics 74 (4):494-522; 1998.

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

* cited by examiner

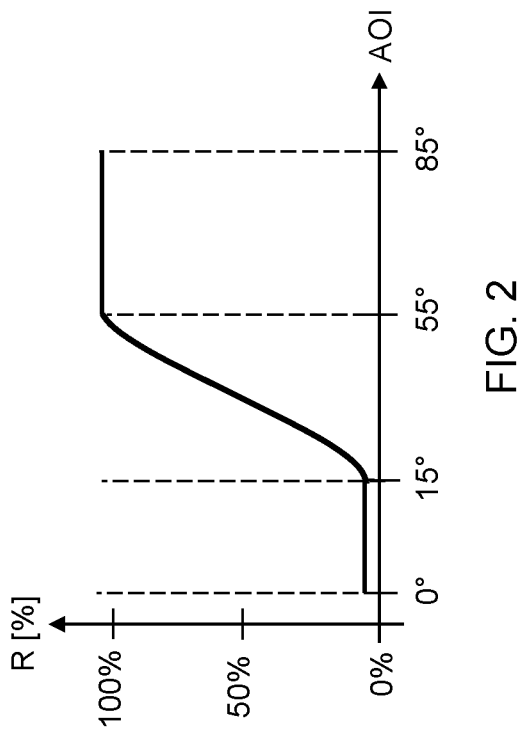
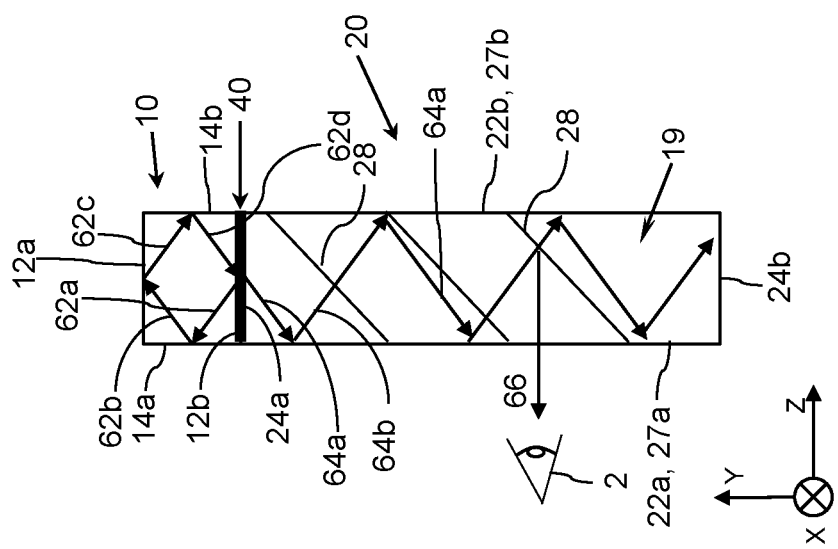
FIG. 2
FIG. 1C

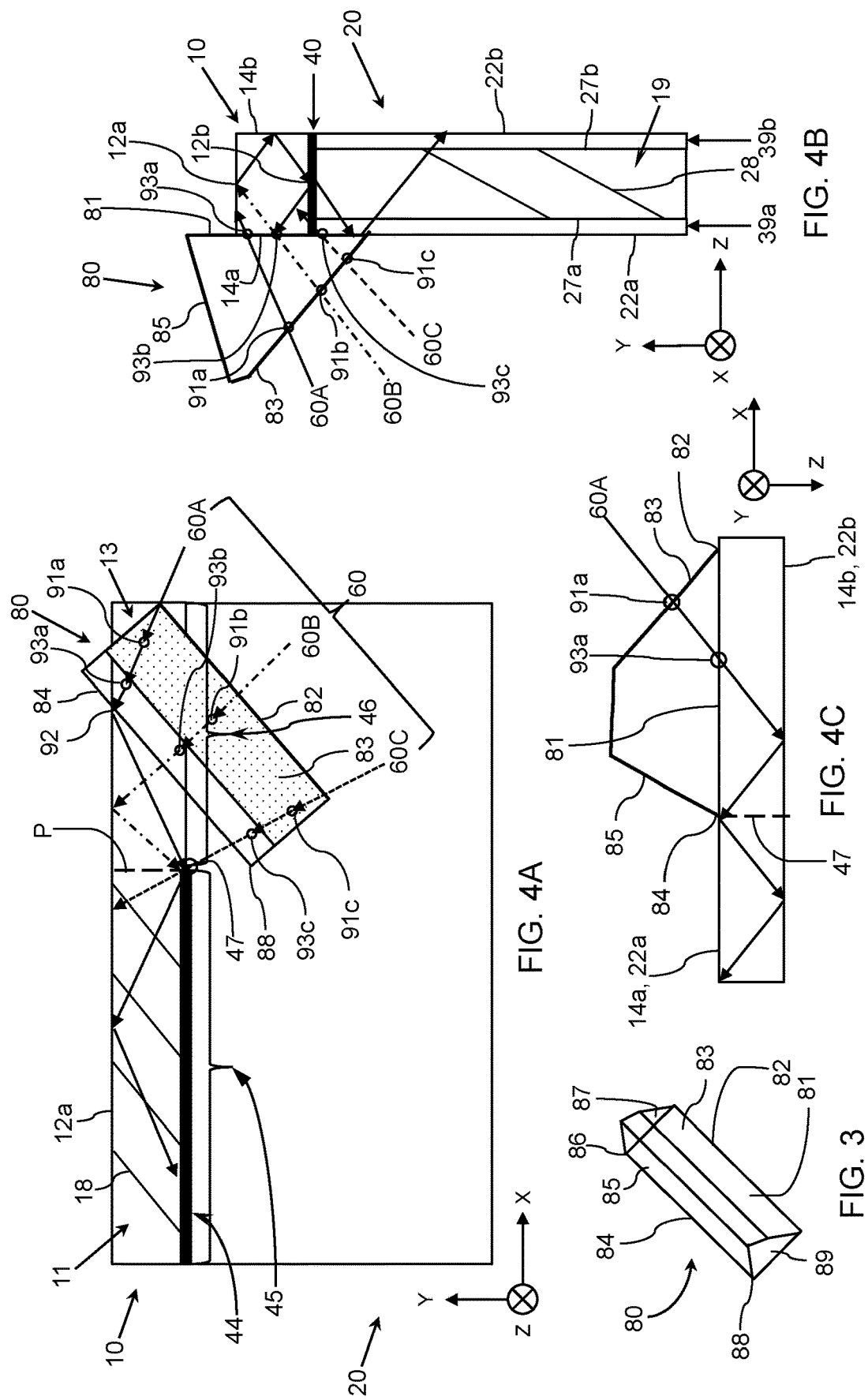

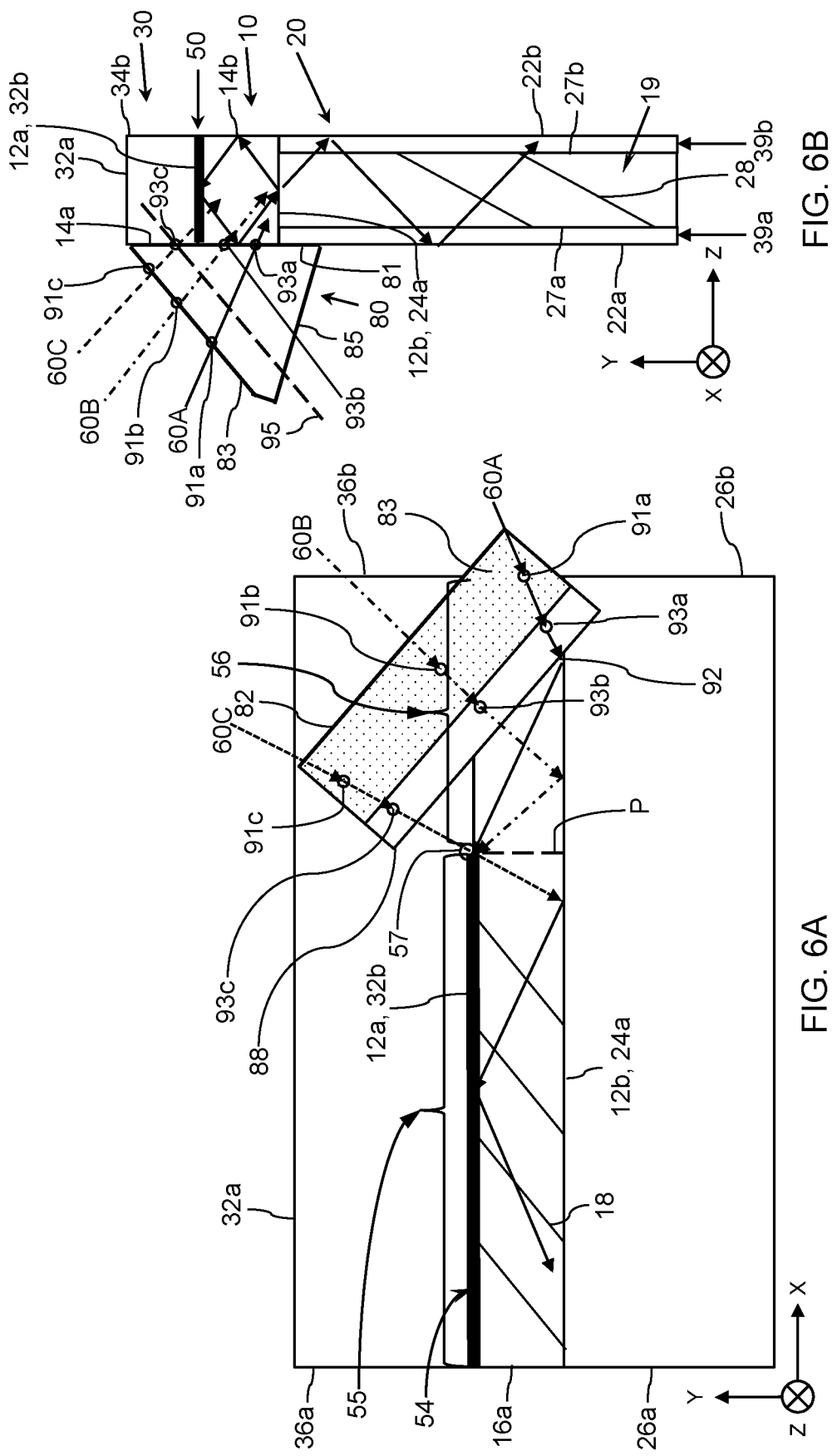

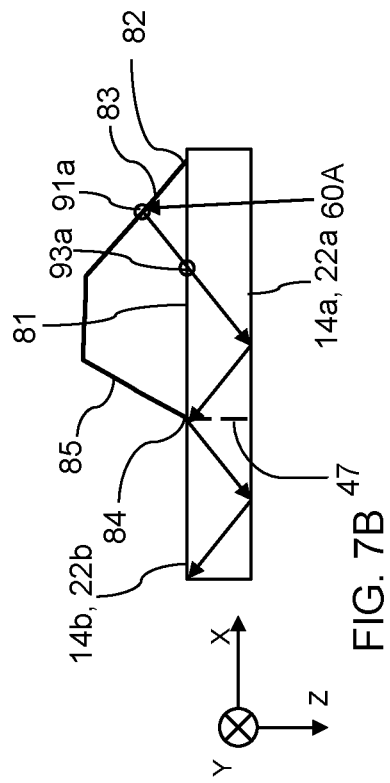
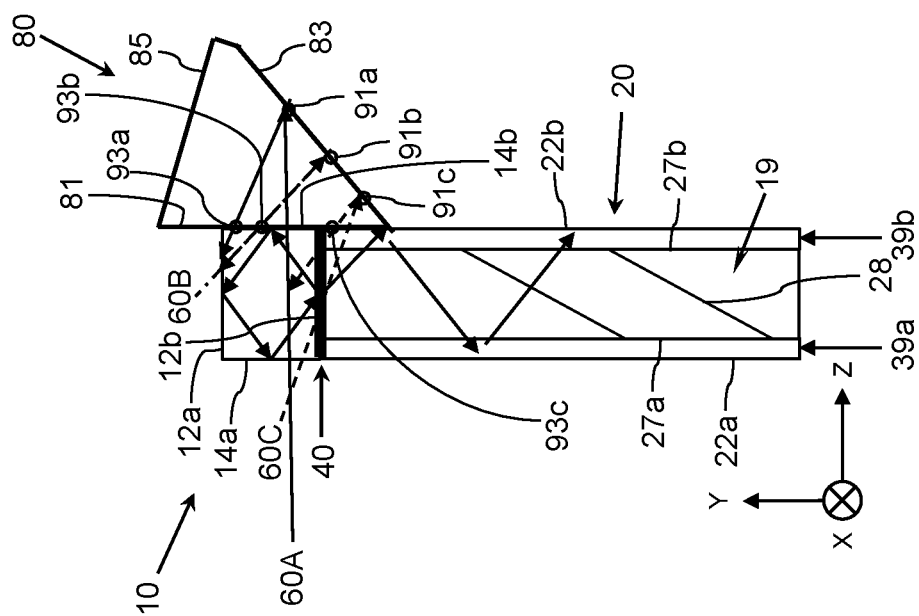
FIG. 7B
FIG. 7A

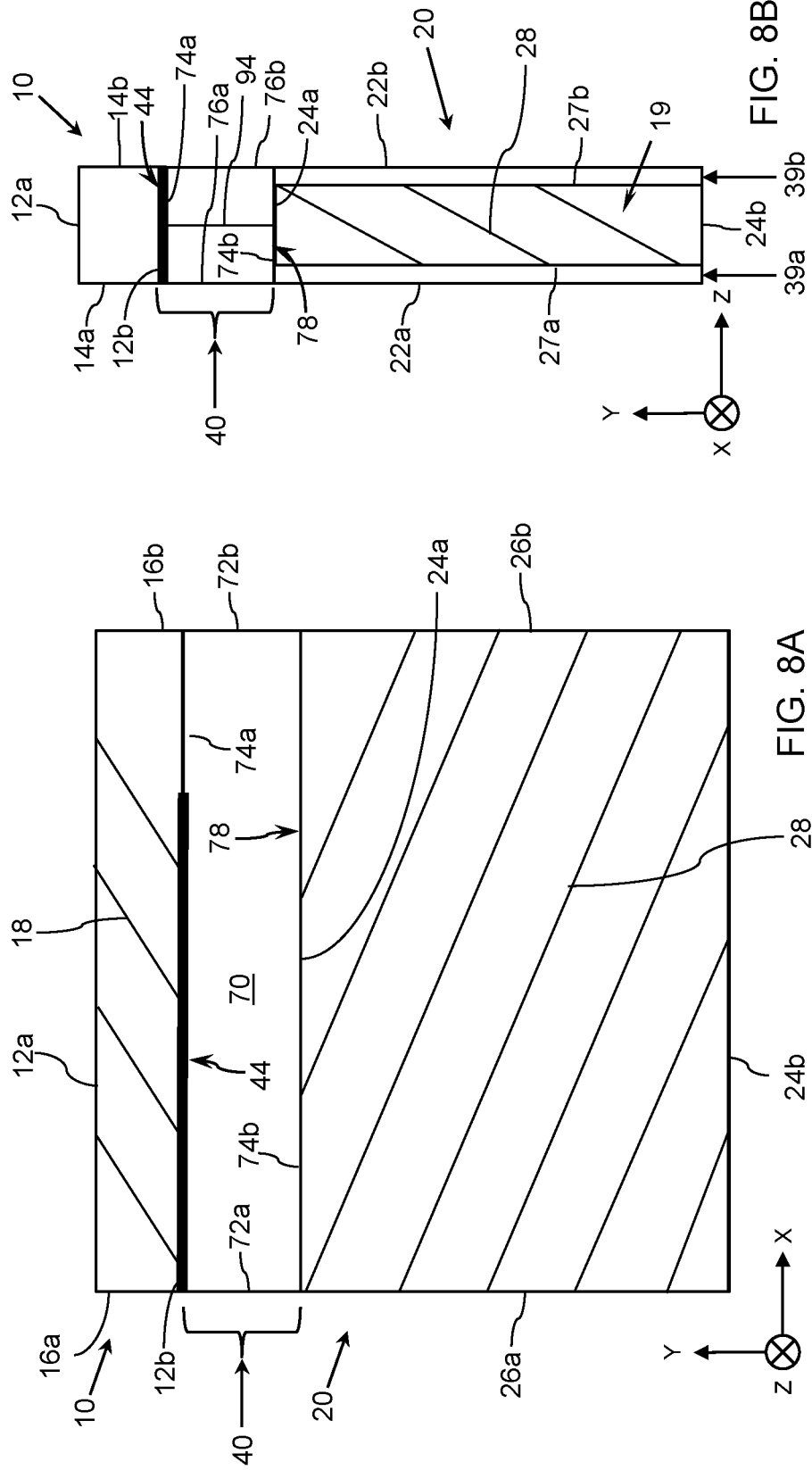

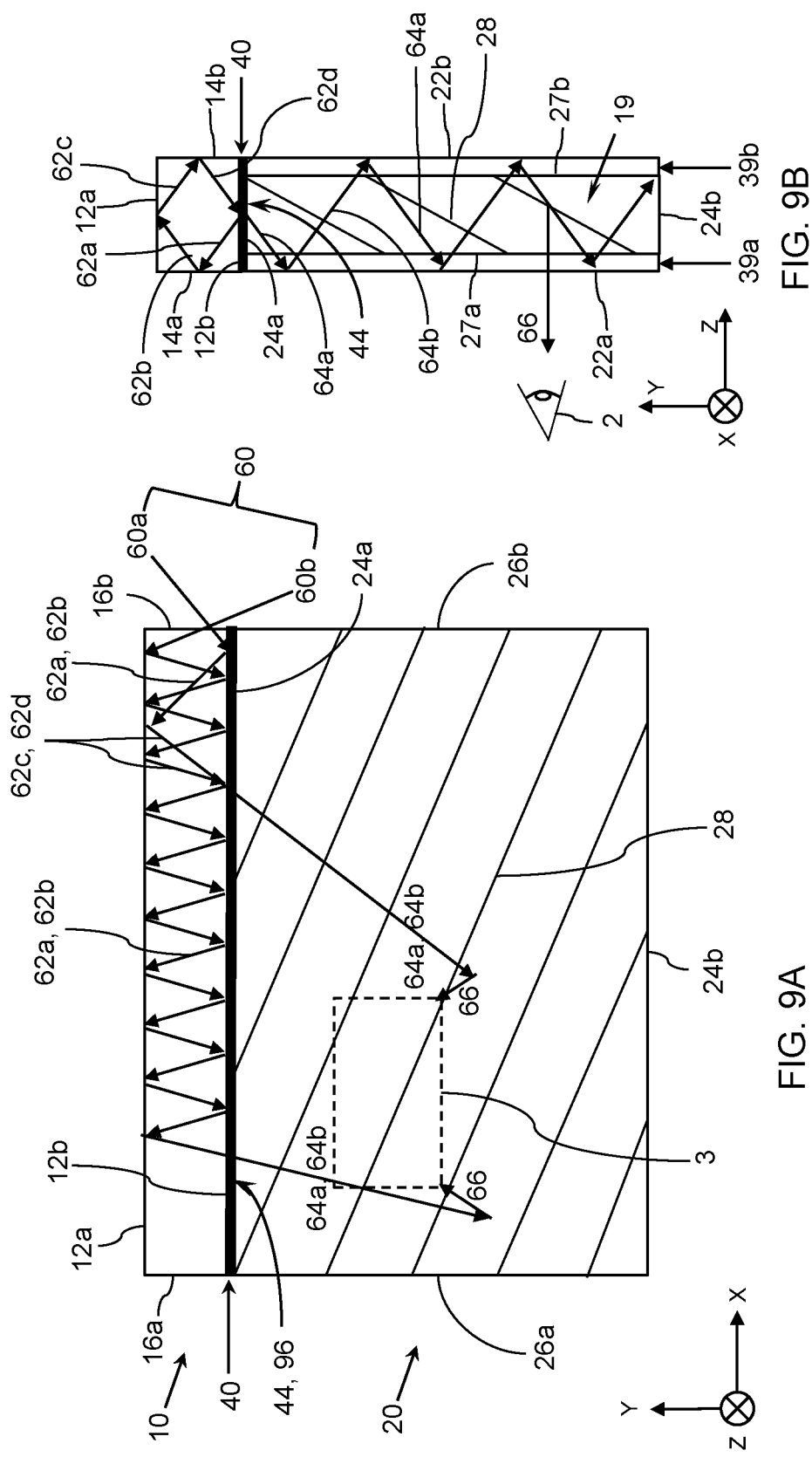

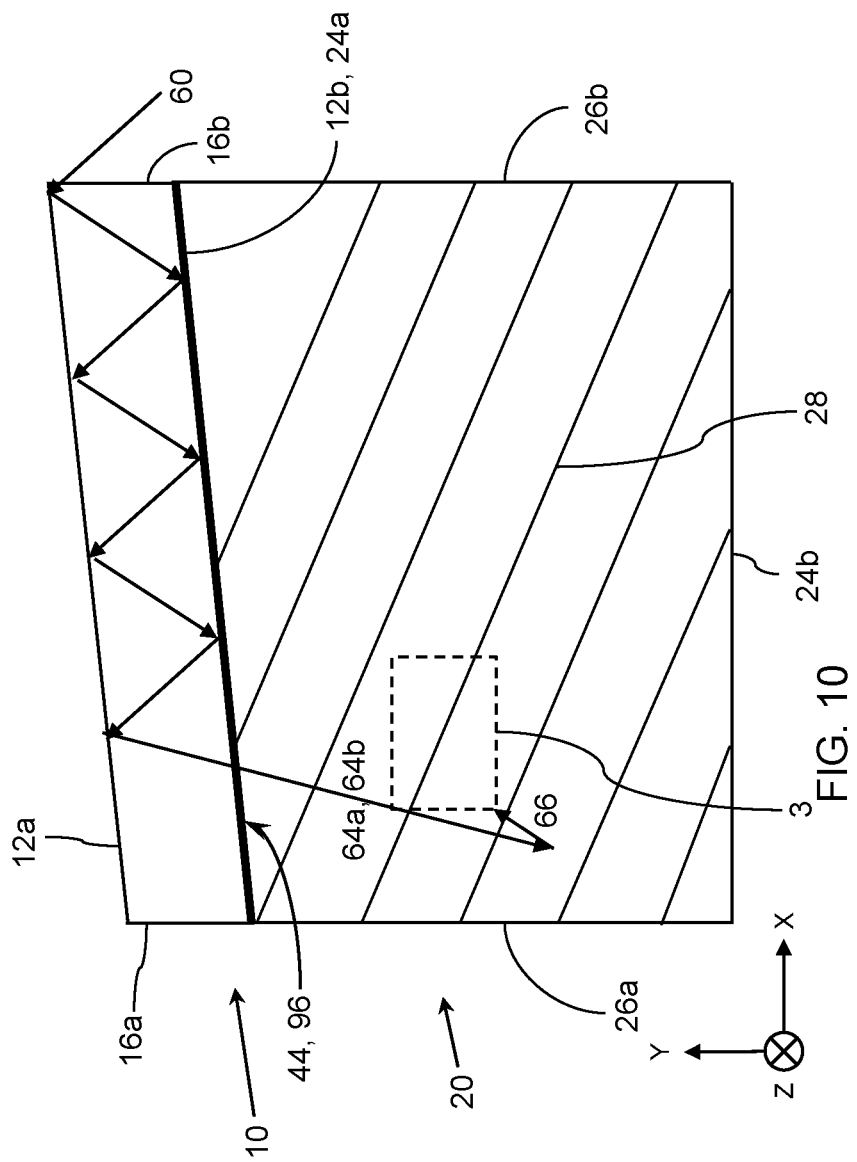

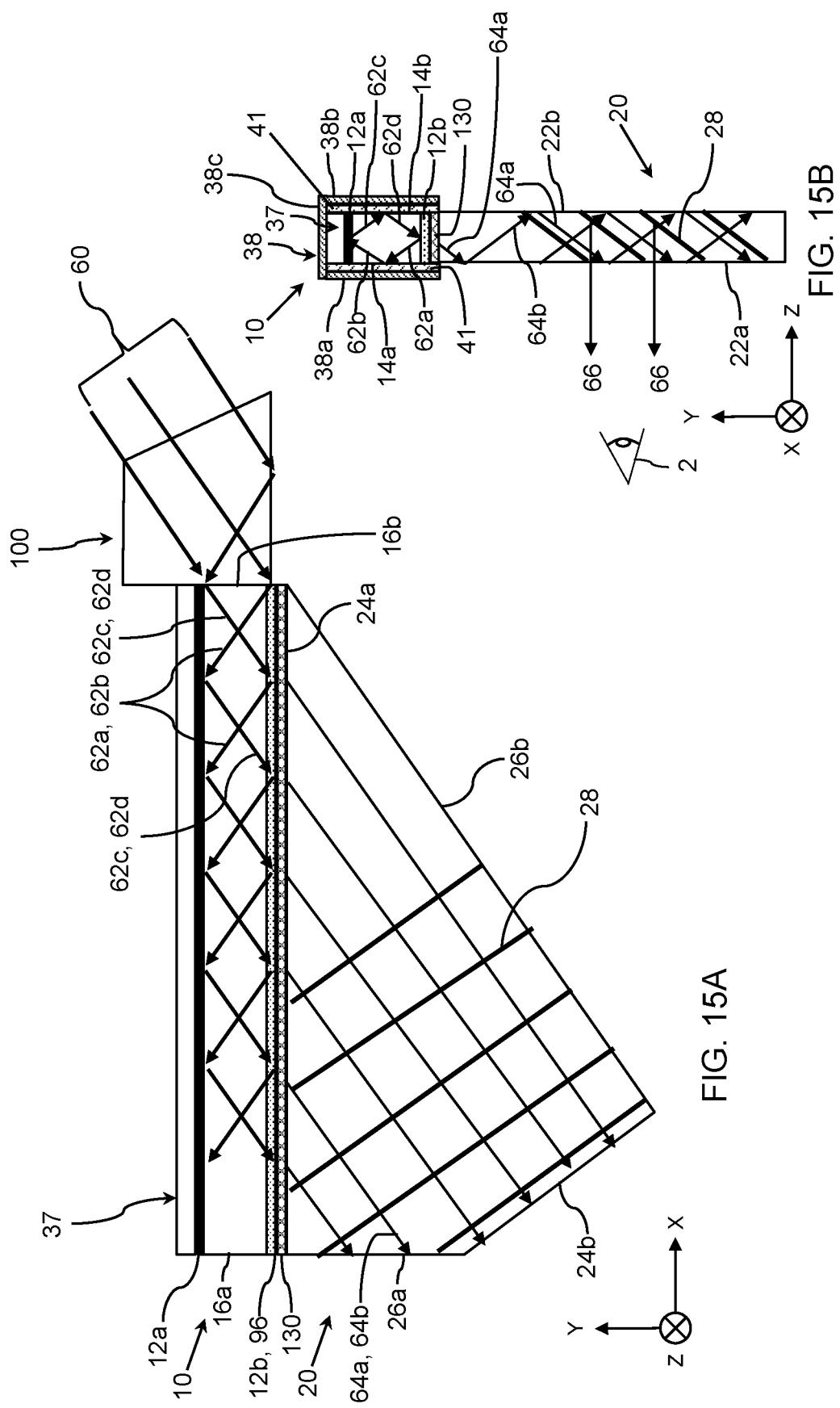

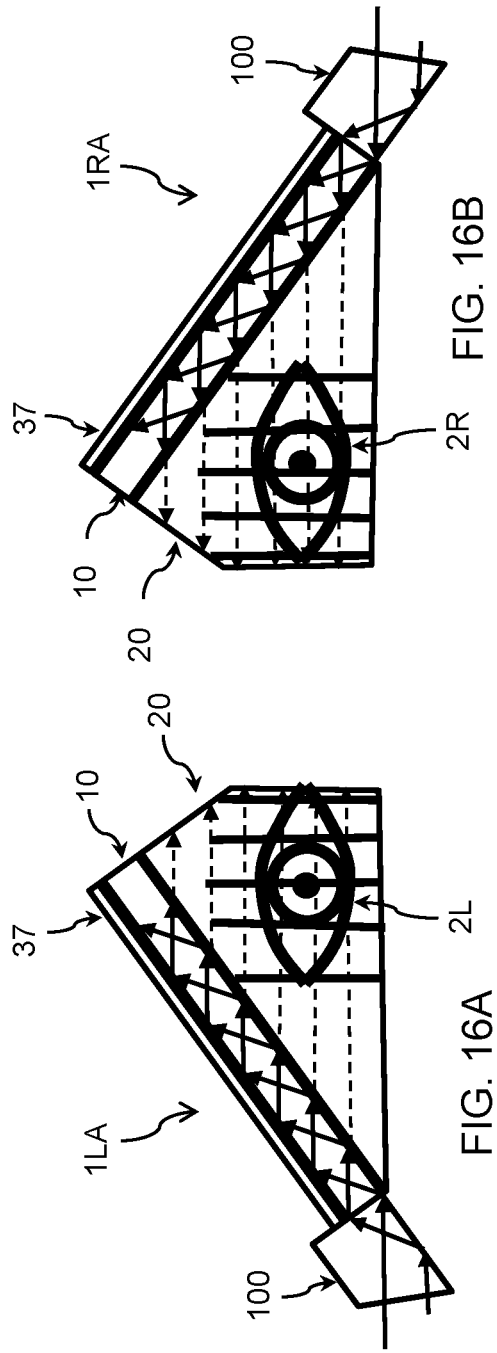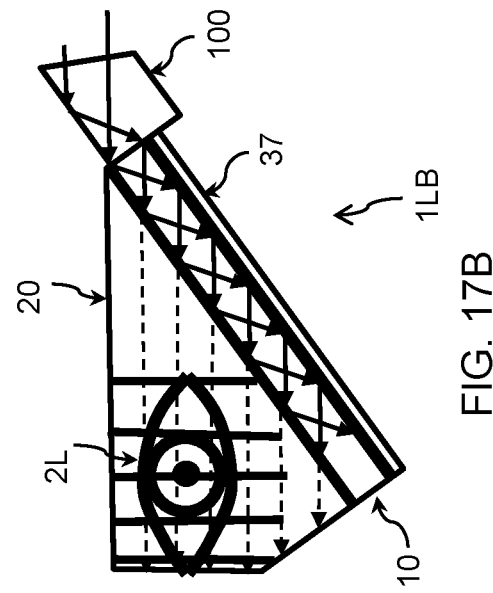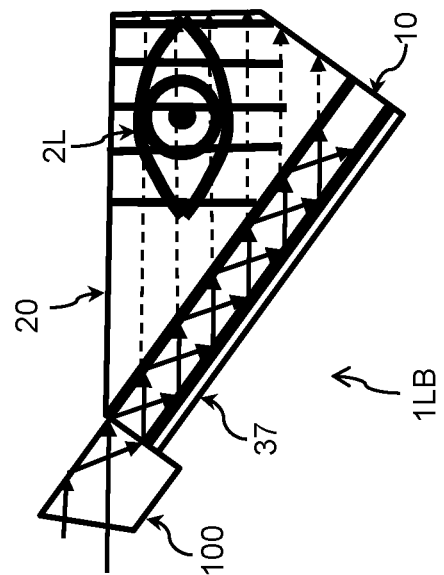

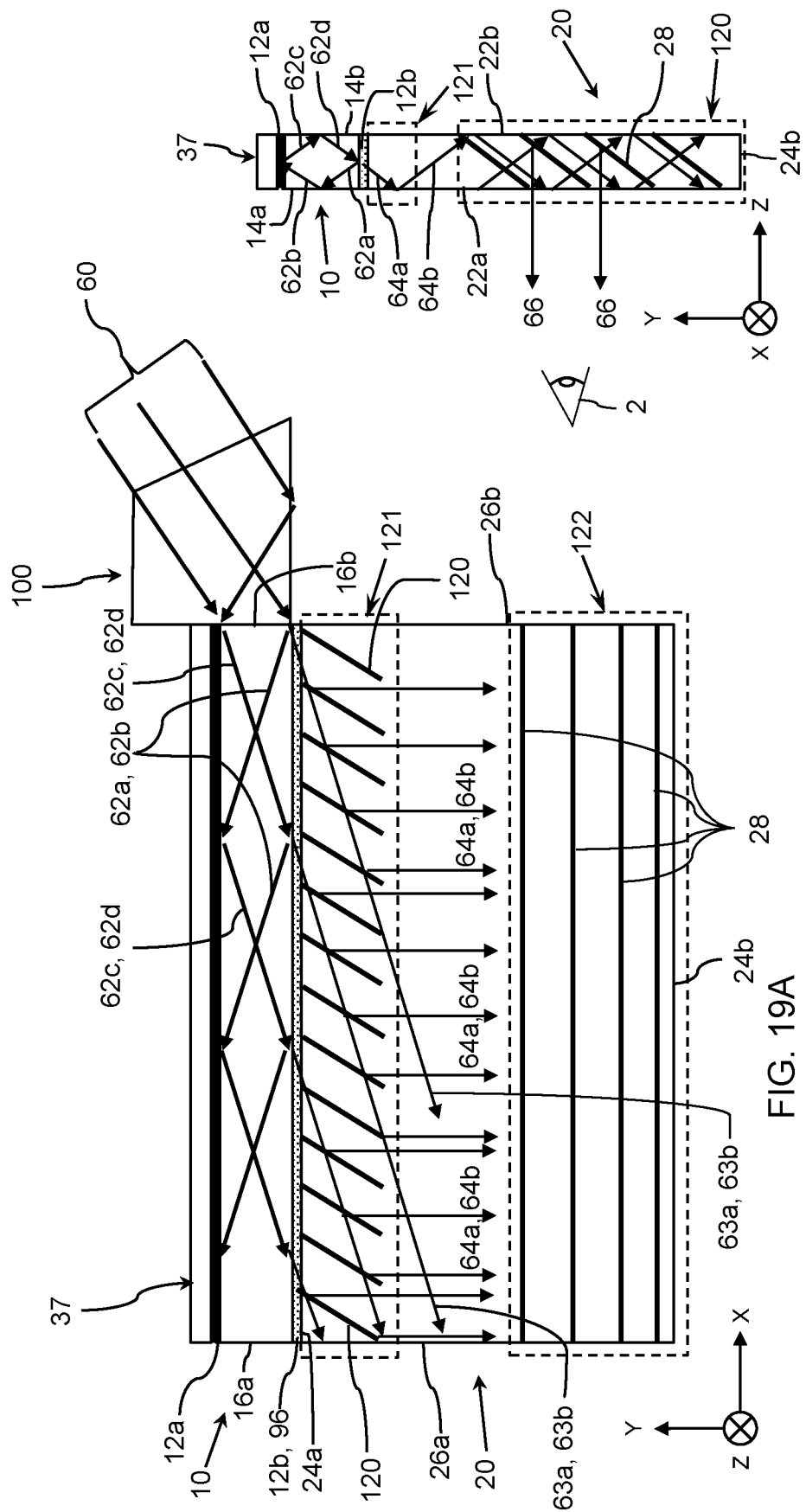

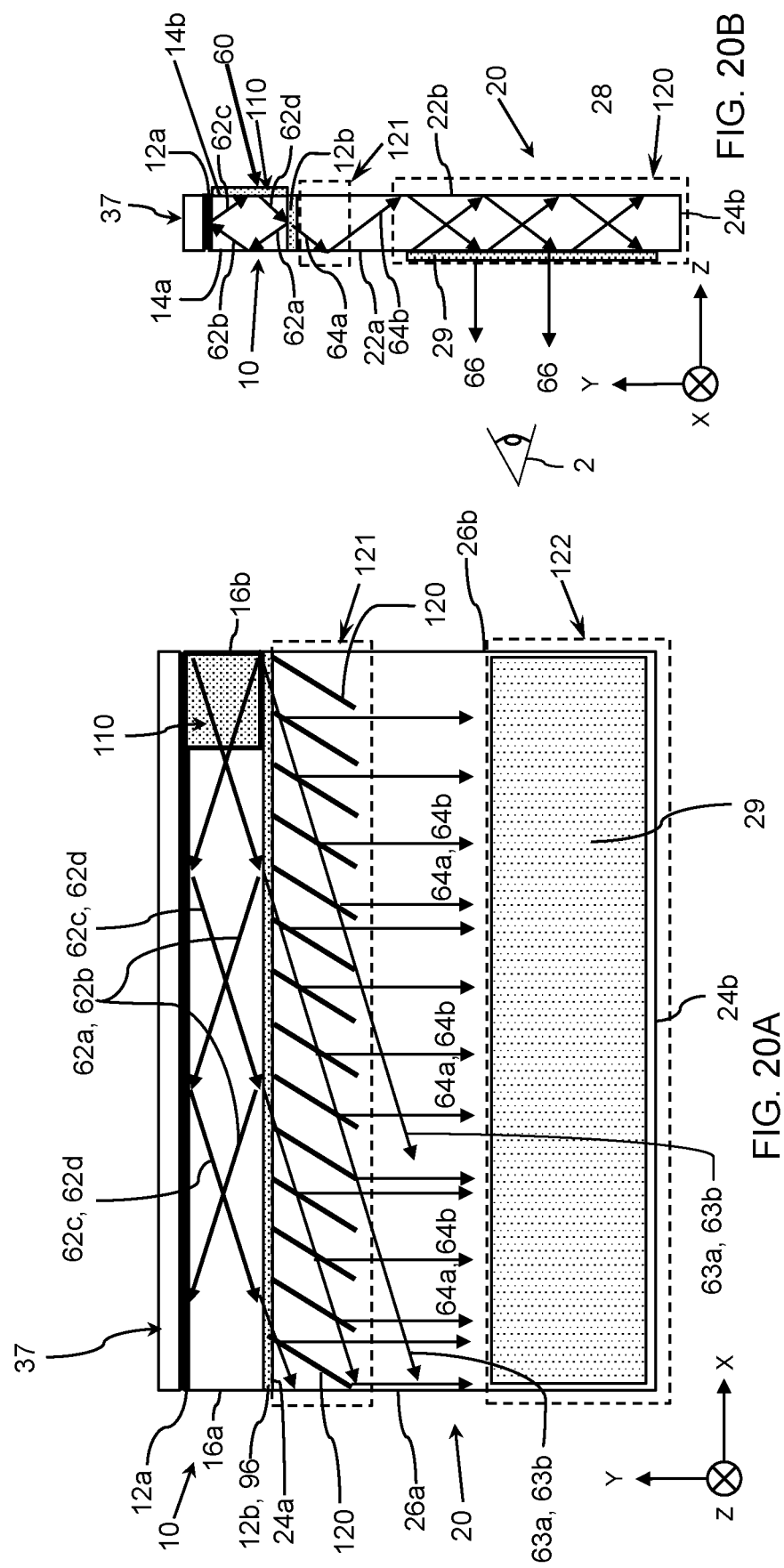

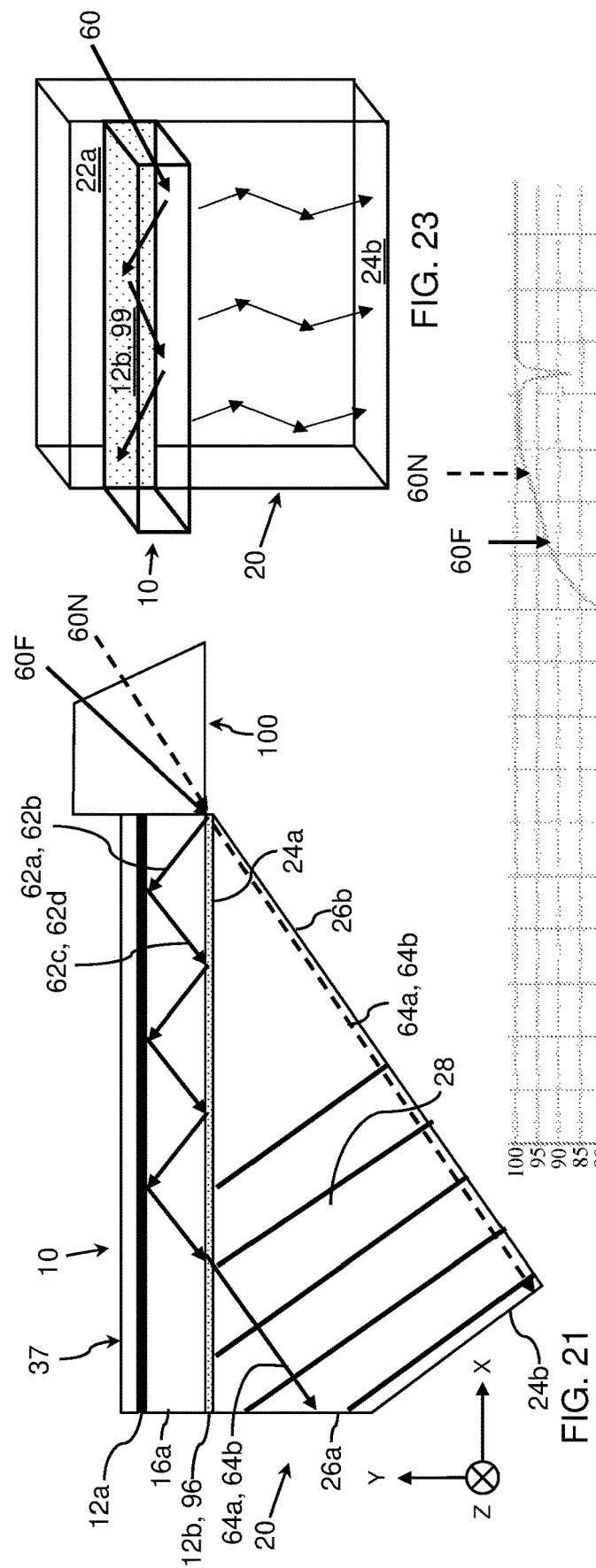
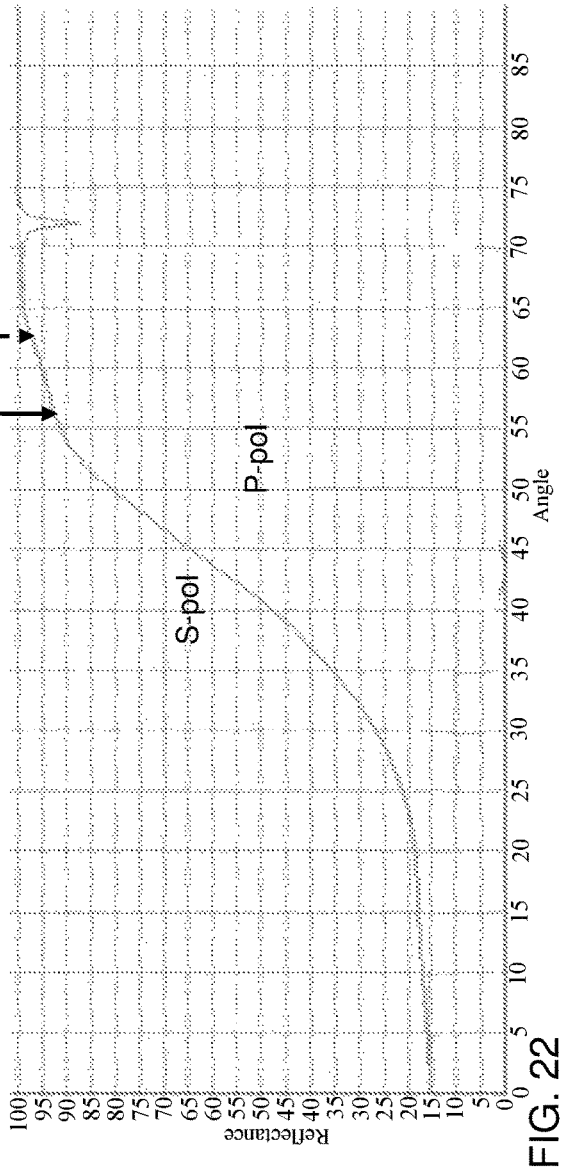
FIG. 21
FIG. 22
FIG. 23

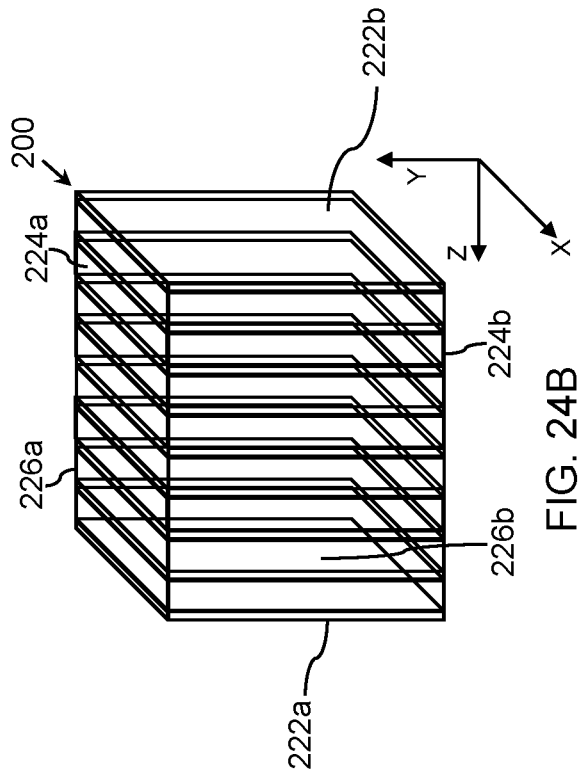
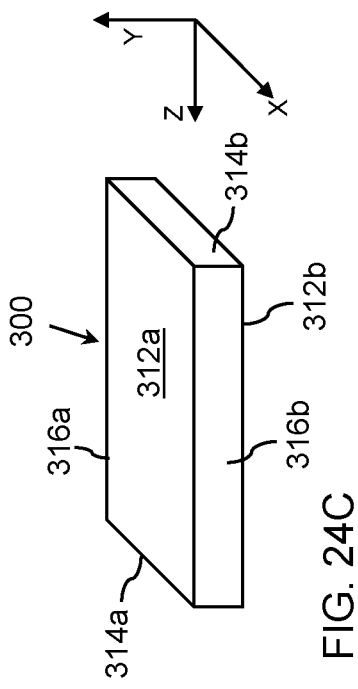
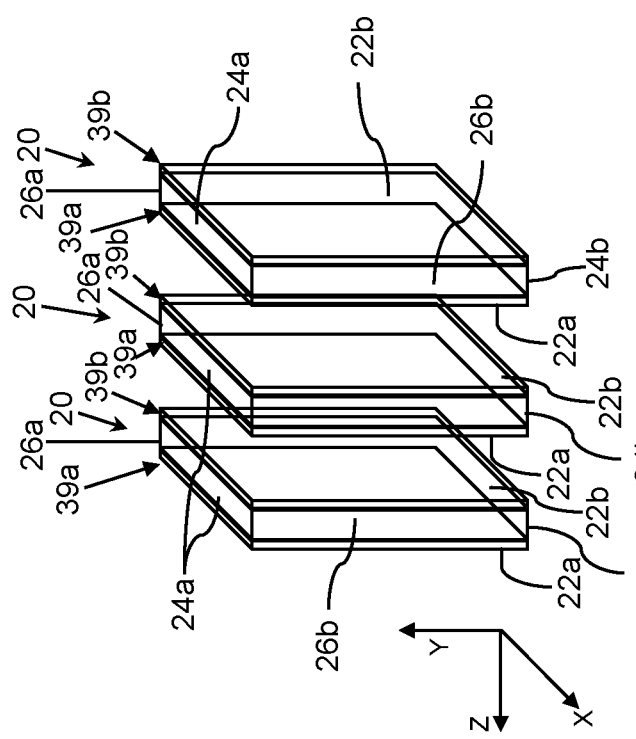
FIG. 24B
FIG. 24C
FIG. 24A

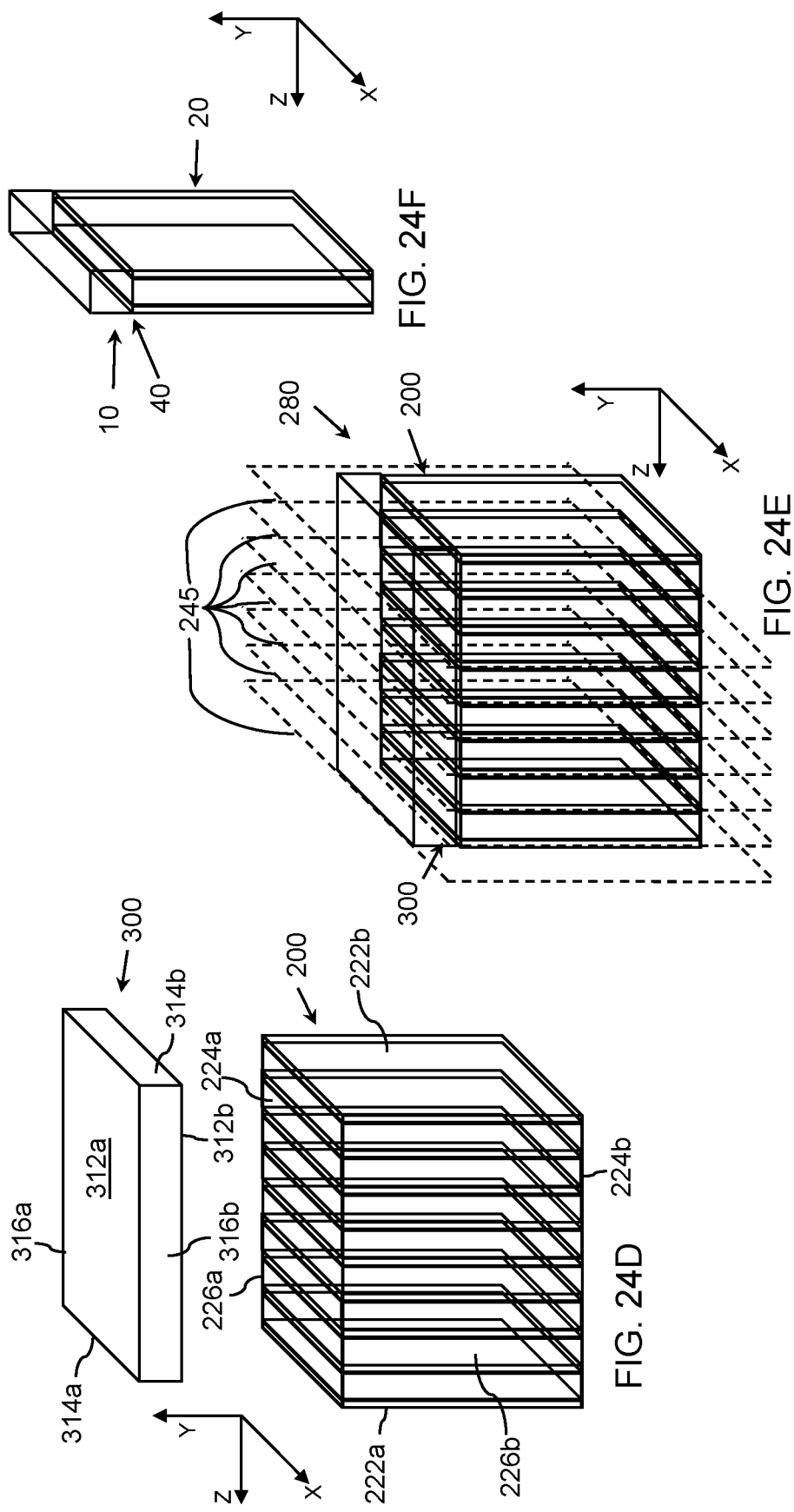

OPTICAL APERTURE MULTIPLIERS HAVING A RECTANGULAR WAVEGUIDE

CROSS-REFERENCE TO RELATED APPLICATIONS

This application claims priority from U.S. Provisional Patent Application No. 63/153,433, filed Feb. 25, 2021, and U.S. Provisional Patent Application No. 63/297,299, filed Jan. 7, 2022, the disclosures of which are incorporated by reference in their entireties herein.

TECHNICAL FIELD

The present invention relates to optical aperture multipliers, and in particular, optical aperture multipliers that include a rectangular optical waveguide optically coupled with thin slab-type optical waveguides.

BACKGROUND OF THE INVENTION

Optical devices that provide two-dimensional optical aperture expansion (or multiplication) have been described in various publications by Lumus Ltd (Israel). In one particular set of such optical devices, two-dimensional aperture expansion is achieved by way of two optical waveguides. The first optical waveguide has two pairs of parallel faces that form a rectangular cross-section and has a first set of partially reflective internal surfaces that are oblique to a direction of elongation of the first optical waveguide. The second optical waveguide, in the form of a thin slab, is optically coupled to the first (rectangular) waveguide and has a pair of parallel major external faces and a second set of partially reflective internal surfaces oblique to the major external faces. The optical coupling and the sets of partially reflecting internal surfaces are such that image light coupled into the rectangular waveguide advances along the rectangular waveguide by four-fold internal reflection (at the two pairs of parallel faces) and a proportion of intensity of the image is reflected at the first set of internal surfaces so as to be coupled into the second waveguide. The image light then advances by internal reflection at the major external faces of the second waveguide, and a proportion of intensity of the image is reflected at the second set of internal surfaces so as to be coupled out of the second waveguide to be viewed by an eye of a viewer.

SUMMARY OF THE INVENTION

Aspects of the present invention provide optical aperture multipliers having rectangular waveguides. Certain preferred embodiments according to a first aspect of the present invention provide optical aperture multipliers, each of which has an optical coupling-in configuration for delivering image light into a first rectangular optical waveguide that is optically coupled with a second thin slab-type optical waveguide. The rectangular waveguide has two pairs of parallel faces (that form a rectangular cross-section) and is configured to guide light by four-fold internal reflection at the two pairs of parallel faces, and to couple the guided light into the second waveguide via a set of partially reflective surfaces internal to the rectangular waveguide. The second waveguide has a pair of parallel faces and is configured to guide the coupled-in light by internal reflection at the pair of parallel faces, and to couple the guided light outwards toward a viewer via a set of partially reflective surfaces internal to the second waveguide (or via one or more diffractive elements). In certain embodiment, the optical coupling-in configuration is deployed on a portion of the front or back side of the rectangular waveguide that adjoins a second region of the interface between the two waveguides that has a different optical characteristic from a first region of the interface. In one set of embodiments, the first region of the interface includes a reflective coating, and the second region is either uncoated or includes a low index material or coating. In another set of embodiments, the first region of the interface is uncoated, and the second region is coated with a low index material.

Certain preferred embodiments according to a second aspect of the present invention provide a rectangular waveguide that does not include a set of partially reflective surfaces internal to the rectangular waveguide. Instead, the optical coupling of light from the rectangular waveguide into the second waveguide is performed by a partially reflective surface that is associated with, and parallel to, the lower face of the rectangular waveguide that forms the optical coupling (interface) with the second waveguide. In certain preferred embodiments, the partially reflective surface is formed by coating the lower face of the rectangular waveguide with one or more dielectric layers, and the light that is coupled into the rectangular waveguide is s-polarized with regard to the coated lower face. The use of a partially reflective surface instead of a set of partially reflective surfaces internal to the rectangular waveguide can simplify the fabrication process and reduce the manufacturing costs of the optical aperture multiplier.

According to the teachings of an embodiment of the present invention, there is provided an optical aperture multiplier. The optical aperture multiplier comprises: a first optical waveguide having a first pair of parallel faces including a first face and a second face, and a second pair of parallel faces including a third face and a fourth face, the pairs of parallel faces together forming a rectangular cross-section, the first optical waveguide configured for guiding light by four-fold internal reflection at the pairs of parallel faces and being associated with an coupling-out configuration that couples light out of the first optical waveguide into a second optical waveguide that is optically coupled with the first optical waveguide, the first or second face is subdivided into a first region and a second region having respectively different optical characteristics; and an optical coupling-in configuration including a surface that transmits light into the first waveguide, the surface being deployed in association with a portion of the third or fourth face that adjoins the second region such that an edge associated with the surface trims an input collimated image in a first dimension and a boundary between the first and second regions trims the input collimated image in a second dimension to produce a trimmed collimated image that advances through the first optical waveguide by four-fold internal reflection.

Optionally, the boundary between the first and second regions together with an image of the boundary presents an apparent input optical aperture when viewed along an optical input axis.

Optionally, some of the input collimated image is reflected at a point on the first face that intersects with or is overlapped by the edge.

Optionally, the edge is a first edge of the surface, and the surface includes a second edge that is a common edge with a light entrance surface that receives the input collimated image from an optical image generator.

Optionally, the edge is parallel to the light entrance surface.

Optionally, the edge is non-parallel to the light entrance surface.

Optionally, the surface receives the input collimated image from an optical image generator, and the edge is a first edge of the surface, and the surface includes a second edge that is a common edge with a reflective surface that reflects the received input collimated image back to the surface so as to be trimmed by the edge.

Optionally, the optical aperture multiplier further comprises the second optical waveguide, the second optical waveguide has a third pair of parallel faces and is configured to guide light by internal reflection at the third pair of parallel faces, and the second optical waveguide includes a plurality of partially reflective surfaces between, and oblique to, the third pair of parallel faces, that couples light out of the second optical waveguide.

Optionally, a coating or material is deployed in association with the second face so as to subdivide the first face into the first and second regions.

Optionally, the optical aperture multiplier further comprises an optical substrate including a fifth face and optically coupled with the first optical waveguide at the first face, and a coating or material is associated with the first face so as to subdivide the first face into the first and second regions.

Optionally, the optical coupling-out configuration includes a plurality of partially reflective surfaces that at least partially traverse the first optical waveguide and are inclined obliquely to a direction of elongation of the first optical waveguide.

Optionally, the optical coupling-out configuration includes a partially reflective surface associated with the second face.

There is also provided according to an embodiment of the teachings of the present invention an optical aperture multiplier. The optical aperture multiplier comprises: a first optical waveguide having a first pair of parallel faces including a first face and a second face, and a second pair of parallel faces including a third face and a fourth face, the pairs of parallel faces together forming a rectangular cross-section, a partially reflective surface is associated with, and is parallel to, the second face; an optical coupling-in configuration for coupling polarized light corresponding to an image into the first optical waveguide with an initial direction of propagation at a coupling angle oblique to both the first and second pairs of parallel faces, the polarized light being s-polarized with regard to the second face; and a second optical waveguide having a plurality of faces including a third pair of parallel faces, the second optical waveguide being optically coupled with the first optical waveguide at an interface between the second face and one of the faces of the second optical waveguide, an optical coupling-out configuration is associated with the second optical waveguide, the optical coupling and the partially reflective surface are configured such that, when the light corresponding to the image is coupled into the first optical waveguide, the light advances by four-fold internal reflection along the first optical waveguide, with a proportion of intensity of the light transmitted at the partially reflective surface so as to be coupled into the second optical waveguide, and propagates within the second optical waveguide by internal reflection at the third pair of parallel faces, with a proportion of intensity of the light propagating within the second optical waveguide deflected out of the second optical waveguide by the optical coupling-out configuration.

Optionally, at least a majority portion of the second face includes one or more dielectric coating layers so as to form the partially reflective surface and such that the partially reflective surface is partially reflective to s-polarized light.

Optionally, the optical aperture multiplier further comprises a waveplate located at the interface for rotating a polarization state of the light to be coupled into the second optical waveguide.

Optionally, the optical coupling-out configuration includes a plurality of partially reflective surfaces deployed within the second optical waveguide oblique to the third pair of parallel faces.

Optionally, the optical coupling-out configuration includes a diffractive optical element associated with at least one of the faces of the third pair of parallel faces.

There is also provided according to an embodiment of the teachings of the present invention an optical aperture multiplier. The optical aperture multiplier comprises: a first optical waveguide having a first pair of parallel faces including a first face and a second face, and a second pair of parallel faces including a third face and a fourth face, the pairs of parallel faces together forming a rectangular cross-section, a partially reflective surface is associated with, and is parallel to, the second face; and a second optical waveguide having a plurality of faces including a third pair of parallel faces, the second optical waveguide being optically coupled with the first optical waveguide at an interface between the second face and one of the faces of the second optical waveguide, a light redirecting arrangement is associated with a first region of the second optical waveguide and an optical coupling-out configuration is associated with a second region of the second optical waveguide, the optical coupling, the partially reflective surface, the light redirecting arrangement, and the optical coupling-out configuration are configured such that, when light corresponding to an image is coupled into the first optical waveguide the light advances by four-fold internal reflection along the first optical waveguide, with a proportion of intensity of the light transmitted at the partially reflective surface so as to be coupled into the first region of the second optical waveguide, and propagates within the first region of the second optical waveguide by internal reflection at the third pair of parallel faces, with a proportion of intensity of the light deflected by the light redirecting arrangement so as to be redirected into the second region of the optical waveguide, and propagates within the second region of the second optical waveguide by internal reflection at the third pair of parallel faces, with a proportion of intensity of the light propagating within the second region of the second optical waveguide deflected out of the second optical waveguide by the optical coupling-out configuration.

Optionally, the optical coupling-out configuration includes a plurality of partially reflective surfaces deployed within the second optical waveguide oblique to the third pair of parallel faces.

Optionally, the optical coupling-out configuration includes a diffractive optical element associated with at least one of the faces of the third pair of parallel faces.

Optionally, the light redirecting arrangement includes a plurality of partially reflective surfaces deployed within the first region of the second optical waveguide oblique to the additional face.

Optionally, the light redirecting arrangement includes a diffractive optical element associated with one of the faces of the second optical waveguide.

There is also provided according to an embodiment of the teachings of the present invention an optical aperture multiplier. The optical aperture multiplier comprises: a first optical waveguide having a first pair of parallel faces including a first face and a second face, and a second pair of parallel faces including a third face and a fourth face, the pairs of parallel faces together forming a rectangular cross-section, a partially reflective surface is associated with, and is parallel to, the second face; and a second optical waveguide having a third pair of parallel faces including a fifth face and a sixth face, an optical coupling-out configuration is associated with the second optical waveguide, and the first optical waveguide is optically coupled with the second optical waveguide and inclined relative to the second optical waveguide such that the second face is inclined obliquely to the fifth face, the optical coupling and the partially reflective surface are configured such that, when the light corresponding to an image is coupled into the first optical waveguide, the light advances by four-fold internal reflection along the first optical waveguide, with a proportion of intensity of the light transmitted at the partially reflective surface so as to enter the second optical waveguide, and some of the light that enters the second optical waveguide propagates within the second optical waveguide by internal reflection at the third pair of parallel faces, with a proportion of intensity of the light propagating within the second optical waveguide deflected out of the second optical waveguide by the optical coupling-out configuration.

Optionally, the optical aperture multiplier further comprises an intermediate window that provides the optical coupling between the first and second optical waveguides, the intermediate window deployed such that some of the light transmitted at the partially reflective surface that enters the second optical waveguide is reflected at the fifth face back toward to the intermediate window.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 2 is a graph of the reflectivity as a function of angle of incidence (AOI), at a majority portion of the interface region between the two optical waveguides, according to embodiments of the present invention;

FIG. 3 is an isometric view illustrating an optical coupling-in configuration that can be used to couple light into the rectangular optical waveguide, according to embodiments of the present invention;

FIGS. 4A-4C are schematic front, side, and top views, respectively, illustrating the optical aperture multiplier corresponding to FIGS. 1A and 1B together with the optical coupling-in configuration of FIG. 3 deployed in a bottom-up configuration, according to embodiments of the present invention;

FIGS. 6A and 6B are schematic front and side views, respectively, illustrating the optical coupling-in configuration of FIG. 3 deployed in a top-down configuration together with an optical substrate coupled with the rectangular optical waveguide, according to embodiments of the present invention;

FIGS. 7A and 7B are schematic side and top views similar to FIGS. 4B and 4C, respectively, showing the optical coupling-in configurations deployed as a coupling prism with a coupling reflector, according to embodiments of the present invention;

FIGS. 8A and 8B are schematic front and side views, respectively, illustrating an optical aperture multiplier having a partially reflective surface deployed in the interface region between the two optical waveguides, according to an embodiment of the present invention;

FIGS. 9A and 9B are schematic front and side views, respectively, illustrating an optical aperture multiplier having a first rectangular optical waveguide optically coupled with a second thin slab-type optical waveguide and further coupled with a block of inert material, in which a partially reflective surface is parallel to, and associated with, a face of the rectangular optical waveguide that is optically coupled with the second optical waveguide and in which the second optical waveguide has a plurality of partially reflective internal surfaces, according to the teachings of embodiments of a second aspect of the present invention;

FIG. 10 is a schematic front view illustrating an optical aperture multiplier similar to the optical aperture multiplier of FIG. 9A, but in which the rectangular optical waveguide is inclined relative to the second optical waveguide, according to an embodiment of the present invention;

FIGS. 15A and 15B are schematic front and side views, respectively, illustrating an optical aperture multiplier having a first rectangular optical waveguide optically coupled with a second thin slab-type optical waveguide, in which a partially reflective surface is associated with a face of the rectangular optical waveguide that is optically coupled with the second optical waveguide and in which a cover member is deployed to cover some of the external faces of the rectangular optical waveguide, according to the teachings of embodiments of the second aspect of the present invention;

FIGS. 16A and 16B show the optical aperture multiplier of FIGS. 15A and 15B deployed in above-eye configurations for a left eye and a right eye, respectively;

FIGS. 17A and 17B show the optical aperture multiplier of FIGS. 15A and 15B deployed in below-eye configurations for a left eye and a right eye, respectively;

FIGS. 19A and 19B are schematic front and side views, respectively, illustrating an optical aperture multiplier having a first rectangular optical waveguide optically coupled with a second thin slab-type optical waveguide, in which a partially reflective surface is associated with a face of the rectangular optical waveguide that is optically coupled with the second optical waveguide and in which the second optical waveguide has a light redirecting arrangement in a first region and a plurality of partially reflective internal surfaces in a second region, according to the teachings of embodiments of the second aspect of the present invention;

FIGS. 20A and 20B are schematic front and side views, respectively, illustrating an optical aperture multiplier, similar to the optical aperture multiplier as represented in FIGS. 19A and 19B, having diffractive coupling-in and coupling-out elements, according to an embodiment of the present invention;

FIG. 21 is a schematic front view illustrating the optical aperture multiplier represented in FIG. 15A, showing beams propagating at the far end and the near end of the rectangular waveguide;

FIG. 22 is a graph of the reflectivity of s-polarized light as a function of AOI that can be used for designing the coating of the partially reflective surface at the interface between the two optical waveguides of any of FIGS. 15A-20B;

FIG. 23 is a schematic isometric view illustrating a variant coupling geometry between a rectangular optical waveguide and thin slab-type optical waveguide, according to an embodiment of the present invention; and FIGS. 24A-24F are schematic isometric views illustrating a sequence of steps used in a process of fabrication of an optical aperture multiplier according to embodiments of the present invention.

DESCRIPTION OF THE PREFERRED EMBODIMENTS

Figure 1:
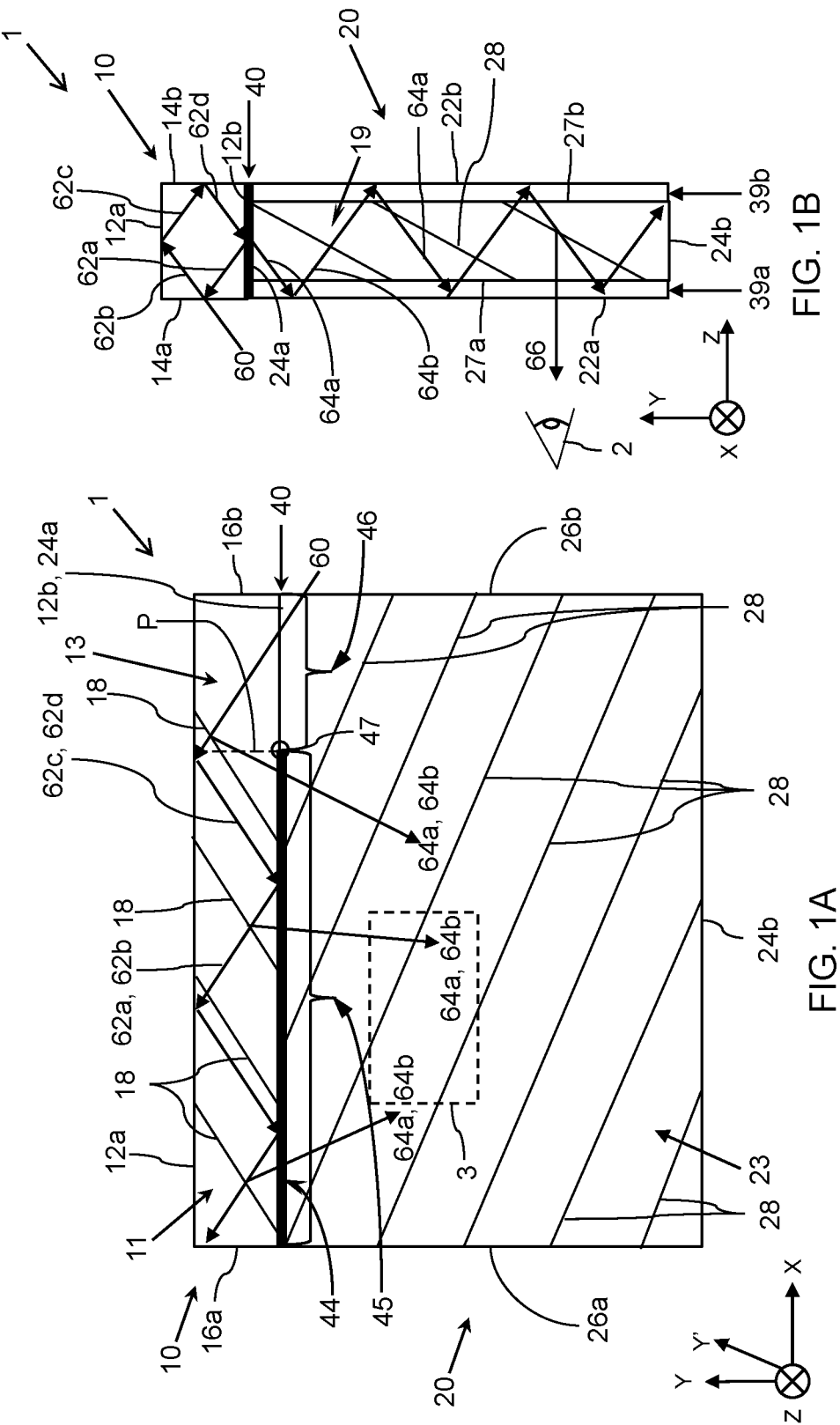
FIGS. 1A and 1B are schematic front and side views, respectively, illustrating an optical aperture multiplier having a first rectangular optical waveguide, having a plurality of partially reflective internal surfaces, optically coupled with a second thin slab-type optical waveguide, having a plurality of partially reflective internal surfaces, according to the teachings of embodiments of a first aspect of the present invention.
FIG. 1C is a schematic side view similar to FIG. 1B, but illustrating the second optical waveguide without cover plates deployed at the external faces of a light-transmitting substrate that forms the second optical waveguide.

Embodiments of aspects of the present invention provide optical devices in the form of optical aperture multipliers having rectangular waveguides.

The principles and operation of the optical devices and methods according to present invention may be better understood with reference to the drawings accompanying the description. The accompanying drawings are provided with an xyz coordinate system that is arbitrarily labeled but which is consistent between the drawings. This xyz coordinate system is used herein to better explain the disclosed embodiments by providing a common reference frame among the drawings.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions, such as, for example, front and back, top and bottom, upper and lower, and the like. These directional references are exemplary only, and are used only for ease of presentation and refer to the arbitrary orientations as illustrated in the drawings. The final optical devices may be deployed in any required orientation.

Referring now to the drawings, FIGS. 1A-7B illustrate an optical aperture multiplier 1, constructed and operative according to embodiments of a first aspect of the present invention. In general terms, the optical aperture multiplier 1 (also referred to as an "optical device") includes a first optical waveguide 10 having a direction of elongation (illustrated arbitrarily herein as corresponding to the "x-axis") and an optical coupling-in configuration 80 that couples image light 60 (also referred to as "light beam" or "beam") corresponding to a collimated image into the optical waveguide 10.

The optical waveguide 10 is formed from a light-transmitting material (light-transmitting substrate) and has first and second pairs of parallel faces 12a, 12b, 14a, 14b forming a rectangular cross-section (i.e., the first and second pairs of faces are orthogonal). The optical waveguide 10 also has an additional pair of faces 16a, 16b (which may or may not be parallel faces). In certain embodiments in which the faces 16a, 16b are parallel faces, the faces 16a, 16b may be orthogonal to the first and second pairs of faces 12a, 12b, 14a, 14b. According to certain embodiments of the present invention, the optical waveguide 10 has a plurality of mutually parallel partially reflective internal surfaces (also referred to as "facets") 18 that at least partially traverse the optical waveguide 10 and are inclined obliquely to the direction of elongation of the optical waveguide 10 (oblique to the faces 12a, 12b). In certain embodiments, the facets 18 are oblique to both faces 12a, 12b and 14a, 14b. Throughout this document, the terms "face", "external face", and "external surface" are used interchangeably. As will become apparent, some of such faces are major faces (also referred to as "major external faces" or "major external surfaces").

In preferred embodiments, the optical aperture multiplier 1 also includes a second optical waveguide 20, optically coupled with the optical waveguide 10, having a third pair of parallel faces 22a, 22b. Here too, according to certain embodiments of the present invention, a plurality of mutually parallel partially reflective internal surfaces ("facets") 28 at least partially traverse the optical waveguide 20 and are inclined obliquely to the faces 22a, 22b. The optical waveguide 20 also has two additional pairs of faces 24a, 24a, 26a, 26b, each of which is non-parallel to faces 22a, 22b, and each of which may or may not be a pair of parallel faces. In certain embodiments, the pairs of faces 22a, 22b, 24a, 24b, 26a, 26b are mutually orthogonal. In certain embodiments, the facets 28 are also inclined obliquely to the face 24a, however, as will be discussed, in other embodiments the facets 28 can be parallel to the face 24a.

The optical waveguide 20 is also formed from a light-transmitting material (light-transmitting substrate 19), and preferably from the same material that is used to form the optical waveguide 10 (such that the two optical waveguides 10, 20 have the same refractive index), but forms a thin slab-type waveguide, where the distances between the pairs of faces 24a, 24b, 26a, 26b are at least an order of magnitude greater than the distance between the faces 22a, 22b.

Preferably, the faces 16a, 26a are parallel, as are the faces 16b, 26b. In addition, preferably the faces 14a, 22a are parallel, as are the faces 14b, 22b.

The optical waveguide 20 is optically coupled with the optical waveguide 10 at an interface 40 between the faces 12b, 24a. In other words, the optical coupling between the optical waveguides 10, 20 defines the interface 40 that is formed between the faces 12b, 24a. It is a particular feature of certain embodiments of the present invention that the optical coupling-in configuration 80 is deployed in association with a portion of the front or back face 14a, 14b of the waveguide 20 that adjoins a particular region 46 of the face 12b (and hence the interface 40) to enable filling of the optical waveguide 10 with the injected aperture of the light beam 60. The specifics of the deployment of the optical coupling-in configuration 80 relative to the waveguides 10, 20 will be described in detail in subsequent sections of the present disclosure, with particular reference to FIGS. 3A-3E.

The optical coupling between the optical waveguides 10, 20, and the deployment and configuration of partially reflective surfaces 18, 28 and the optical coupling-in configuration 80 are such that, when the optical coupling-in configuration 80 couples (injects) the image light 60 into the optical waveguide 10 with an initial direction of propagation at a coupling angle oblique to both the first and second pairs of parallel faces 12a, 12b, 14a, 14b, the image advances by four-fold internal reflection (images 62a, 62b, 62c, 62d) along optical waveguide 10, with a proportion of intensity of the image reflected at the partially reflective surfaces 18 so as to be coupled into the optical waveguide 20, and then propagates through two-fold internal reflection (images 64a, 64b) within the optical waveguide 20, with a proportion of intensity of the image reflected (deflected) at the partially reflective surfaces 28 so as to be directed outwards from one of the parallel faces 22a as a visible image 66, seen by the eye 2 of a viewer. The eye 2 that is located at some position within a permitted range of positions designated by an eye-motion box (EMB) 3 (that is, a shape, typically represented as a rectangle, spaced away from the plane of the face 22a of the optical waveguide 20 from which the pupil of the eye 2 will view the projected image).

The optical waveguide 10 is referred to herein as a two-dimensional (2D) waveguide in the sense that it guides the injected image in two dimensions by reflection between two sets of parallel faces 12a, 12b, 14a, 14b, while the optical waveguide 20 is referred to as a one-dimensional (1D) waveguide or light-guide optical element (LOE), guiding the injected image in only one dimension between one pair of parallel faces 22a, 22b. Light beam 60 (generated by an optical image generator, not depicted) is injected into the optical waveguide 10 by the optical coupling-in configuration 80 at an angle. Consequently, the light propagates along the optical waveguide 10 while being internally reflected from all four external faces 12a, 12b, 14a, 14b of the optical waveguide 10 as shown in the side view of FIG. 1B. In this process, four conjugate beam vectors are generated 62a, 62b, 62c, 62d which represent the same image as it is reflected internally by the faces 12a, 12b, 14a, 14b.

Part of the guided light beams (for example 62a and 62b) within the optical waveguide 10 are reflected by the facets 18 downward through the interface 40 and onto an input coupling surface (face 24a) of the optical waveguide 20. In the optical waveguide 20, these beams are defined as 64a and 64b. Beams 64a and 64b are reflected by the external faces 22a, 22b and become conjugate, i.e., beam 64a is reflected to be 64b and vice versa (as depicted in FIG. 1B). In other words, the optical waveguide 20 guides the image light 64a, 64b by two-fold internal reflection at the at the faces 22a, 22b, such that the image light 64a, 64b advances by two-fold internal reflection (images 64a, 64b) along the optical waveguide 20. The internal reflection within the optical waveguide 20 can be achieved by TIR, due to the steep angles at which the facets 18 inject the light beams into the optical waveguide 20, or can be achieved by optical coating.

As previously mentioned, the external front and back faces 14a, 14b of optical waveguide 10 should be parallel to each other and, in this implementation, to the corresponding external faces 22a, 22b of the optical waveguide 20. Any deviation from parallelism will cause the coupled images 64a and 64b not to be precise conjugate images, and image quality will degrade.

The facets 28 within the optical waveguide 20 reflect beam 64b outside of the optical waveguides and toward the eye 2 as a visible image (referred to as a "projected image"). In the illustrated embodiment, the partial reflectivity of the facets 18, 28 is determined by optical coatings (selectively reflective coatings) on the facets 18, 28.

Each of the sets of facets 18, 28 is an optical coupling-out configuration that is associated with the respective optical waveguide and that functions to couple propagating light out of the optical waveguide. However, as will be discussed in subsequent sections of the present disclosure, other embodiments are contemplated in which the optical coupling-out configurations take other forms. For example, in certain embodiments, instead of internal facets 18, the optical coupling-out configuration associated with the first optical waveguide 10 can take the form of a partially reflective surface at the interface 40 between the optical waveguides 10, 20 that is parallel to the bottom face 12b of the waveguide 10. In certain embodiments, the optical coupling-out configuration associated with the second optical waveguide 20 can take the form of one or more diffractive elements on one or more portions of the faces 22a, 22b.

The combined reflections by the external faces and internal facets of the waveguides 10 and 20 expand the original injected aperture in both first and second dimensions. The waveguide 10 expands the aperture in the first dimension (which is the x dimension in FIG. 1A) and the waveguide 20 expands the aperture in the second dimension that is orthogonal to plane of the facets 18 (which is approximately along the y dimension in FIG. 1A, but in the illustrated embodiment is more particularly along the y' dimension which is offset from the y axis). The aperture expansion of the waveguide 10 is preferably achieved by filling the waveguide with the image and then coupling the image out of the waveguide via the facets 18 in a continuous manner along the length of the waveguide.

It is noted that in many of the embodiments illustrated herein, the faces 22a, 22b are actually formed as external faces of cover plates 39a, 39b that are optically attached to the external faces 27a, 27b of the light-transmitting substrate 19 from which the optical waveguide 20 is formed. The facets 28 generally extend between the external faces 27a, 27b of the substrate, and thus do not extend between the faces 22a, 22b of the cover plates 39a, 39b. The cover plates 39a, 39b can be used to avoid double reflections, i.e., situations in which images 64a or 64b are reflected twice from the same facet. Specifically, the cover plates 39a, 39b help to ensure that, after being reflected once by a facet 28, the transmitted portion of the light will propagate over or under that facet, advancing directly to the next facet, thereby resulting in enhanced image uniformity. In certain embodiments, however, the cover plates 39a, 39b can be excluded, and the thickness of the substrate 19 can be adjusted such that the external faces 27a, 27a of the substrate 19 and the faces 22a, 22b of the waveguide 10 are one in the same. An example of an optical aperture multiplier having a thin slab-type optical waveguide 20 without cover plates is illustrated in FIG. 1C. All of the embodiments of the present invention that are described herein with cover plates 39a, 39b can also be practiced without such cover plates, unless expressly indicated otherwise.

It is also noted that as the image advances through the optical waveguide 10, the intensity of the illumination gradually decreases due to the progressive coupling-out of light by the facets 18. In order to achieve better uniformity and light efficiency, in certain preferred embodiments the reflectivity of the facets 18 increases along the direction of propagation of light through the optical waveguide 10, which provides a gradual increase in the intensity of light coupled into the optical waveguide 20. In the same fashion, in certain embodiments the reflectivity of the facets 28 also preferably increases along the direction of propagation of light through the optical waveguide 20 to offset decreases in light intensity imparted by the progressive coupling-out of light by the facets 28.

Parenthetically, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image.

With particular reference to FIGS. 1A and 1B, the face 12b is subdivided into non-overlapping first and second regions 45, 46 that have respective first and second optical characteristics. The first region 45 occupies (i.e., extends along) the majority, but not the entirety, of the face 12b along the direction of elongation, whereas the second region 46 occupies (extends along) the remaining minority portion of the face 12b along the direction of elongation. The region 45 is preferably at least 70% of the face 12b in the direction of elongation, however, the particular amount of the extension in the direction of elongation may be based on the optical design specification of the optical aperture multiplier, in particular the size and deployment position of the optical coupling-in configuration 80, as will be discussed in subsequent sections of the present disclosure. In certain cases, the amount of the extension in the direction of elongation may be at least 80% or at least 90%.

The first optical characteristic is a partially reflective characteristic which preserves conditions of internal reflection, such that light reflected from one of the faces 12a, 14a, 14b that is incident to portions of the face 12b in the region 45 is reflected at the face 12b (so as continue propagation through the waveguide 10 by internal reflection), but also such light that is deflected by the facets 18 towards portions of the face 12b in the region 46 is transmitted by the face 12b into the waveguide 20. The second optical characteristic, which is different from the first optical characteristic, is a transmissive characteristic, such that light from the optical coupling-in configuration 80 can enter the waveguide 10 via transmission through a portion of the waveguide 10 that adjoins the region 46.

Moreover, the optical waveguide 10 is subdivided into first and second waveguide regions 11, 13 by the rectangular cross-sectional plane P (which in the arbitrarily labeled coordinate system is the yz plane) in the optical waveguide 10 that is orthogonal to the direction of elongation and passes through the boundary 47 between the two regions 45, 46. The bottom face of the first waveguide region 11 is the first region 45 of the face 12b (in other words the first region 45 corresponds to the first waveguide region 11), and the bottom face of the second waveguide region 13 is the second region 46 of the face 12b (in other words the second region 46 corresponds to the second waveguide region 13, which is also referred to as a "coupling-in region" of the waveguide 10).

In certain embodiments, the subdivision of the face 12 is effectuated at least in part by a coating or material 44 that is deployed in association with a majority portion of the face 12b that extends along the majority, but not the entirety, of the face 12b in the direction of elongation. The extension of the coating or material 44 is also preferably along the entirety of the face 12b in the transverse (or lateral) direction (which in the arbitrarily labeled coordinate system is along the z-axis), as illustrated in FIGS. 1B and 1C. The first region 45 of the face 12b is associated with the material or coating 44, and the second region 46 of the face 12b is not associated with the material or coating 44. In addition, since the interface 40 is formed between the faces 12b, 24a, the coating or material 44 is located at the interface 40 and effectively subdivides the interface 40 into two regions corresponding to the two aforementioned regions 45, 46.

In certain embodiments, the extension of the material or coating 44 is along at least 70% of the face 12b in the direction of elongation, however, the amount of the extension in the direction of elongation may be at least 80% or at least 90%.

The material or coating 44 can be applied to either or both of the faces 12b, 24a prior to coupling the two waveguides 10, 20 together such that the material or coating 44 extends along the majority portion (region 45) of the face 12b, and such that the material or coating 44 is absent from the minority portion 46 of the face 12b (which in the illustrated embodiment is proximate to faces 16b, 26b).

In one example, the material or coating 44 is a reflective coating that can be a selectively reflective coating such as an angularly selective reflective (ASR) coating that reflects incident light at only a particular range of angles of incidence (AOIs) and transmits light outside of that range of angles (preferably in accordance with the reflectivity shown in FIG. 2). The reflectivity of the coating 44 is such that light reflected from one of the faces 12a, 14a, 14b that is incident to the face 12b is reflected at the face 12b, and light that is deflected by the facets 18 towards the face 12b is transmitted by the face 12b into the waveguide 20. Alternatively, the reflective coating can be applied to the face 24b, or the reflective coating can be applied to one or more corresponding portions of the faces 12b, 24a such that when the optical waveguides 10, 20 are bonded or optically coupled together, the resultant reflective coating extends along the majority of the face 12b.

In another example, a thin film of partially reflective material having selectively reflective properties as discussed above can be applied to the majority of the face 12b (or alternatively the face 24a) in the direction of elongation prior to bonding together the faces 12b, 24a.

In yet another example, the material or coating 44 is a partially reflective material in the form of a separate partially reflective surface that is located between the faces 12b, 24a, and that extends along the majority of the faces 12b, 24a in the direction of elongation. The partially reflective surface can be formed from any thin plate of material that is coated with a reflective coating having selectively reflective properties as discussed above.

In certain embodiments, the region 46 is formed merely by applying the material or coating 44 to the majority portion of the face 12b (or the face 24a) and withholding the material or coating 44 from the remaining minority portion of the face 12b (or the face 24a), such that the first region 45 is a "coated portion" and the second region 46 is an "uncoated portion" whereby the coated and uncoated portions intrinsically have different optical characteristics. However, in certain preferred embodiments, a low refractive index material or coating (i.e., material or coating having a refractive index lower than the refractive index of the material used to fabricate the optical waveguide 10, 20), having an optical characteristic different from the material or coating 44, is associated with the remaining minority portion of the face 12b so as to extend along the minority portion (region 46) of the face 12b. In one example, a thin plate of low index material is used. The thin plate can either be deposited directly on the minority portion of one of the faces 12b or 24a and then adhesively bonded to the other of faces 24a or 12b with a thin adhesive layer, or can be adhesively bonded to the faces 12b, 24a using thin adhesive layers. In another example, a thin coating layer of a solid dielectric material. A family of Aerogel materials having a very low refractive index (1.1-1.2), as well as stabilizing mechanical properties, have been developed over the years, and may be particularly suitable for forming the region 46. In another example, low index optical cement is deployed at the minority portion 46 and is also used to help bond together the optical waveguides 10, 20.

In certain embodiments, the region 46 is formed merely by applying a low index material to the minority portion of the face 12b (or the face 24a) and not applying any coating or material to the majority portion of the face 12b (or the face 24a), such that the first region 45 is an "uncoated portion" and the second region 46 is a "coated portion" whereby again these coated and uncoated portions intrinsically have different optical characteristics.

In embodiments in which facets 18 are used to couple light out of the waveguide 10 and into the waveguide 20, the material or coating 44 may not be necessary, whereby the reflection of the propagating light at the face 12b is by total internal reflection. In such embodiments, the subdivision of the face 12b into the two regions can be effectuated by applying a low index material to the minority portion of the face 12b (or face 24a) and not applying any coating or material to the majority portion of the face 12b (or face 24a). In embodiments in which the bottom face 12b of the waveguide 10 is implemented as a partial reflector for coupling a proportion of the intensity of the propagating light out of the waveguide 10 (and into the waveguide 20), subdivision of the face 12b into the two aforementioned regions is preferably effectuated at least in part by application of the coating or material 44 at the majority portion of the face 12b (or face 24a). In such embodiments, the coating or material 44 is preferably implemented as a dielectric coating and/or metallic coating, as will be discussed in subsequent sections below.

In order to obtain uniform intensity across the expanded aperture, the injected initial aperture of the beam should be uniform and should "fill" the waveguide. The term "fill" is used in this context to indicate that rays corresponding to each point (pixel) in the image are present across the entire cross-section of the optical waveguide 10. Conceptually, this property implies that, if the optical waveguide 10 were to be cut transversely at any point, and if an opaque sheet with a pinhole was then placed over the cut end, the pinhole could be placed anywhere across the cross-section and would result in a complete projected image. In fact, for the optical waveguide 10, this would result in projection of four complete images 62a, 62b, 62c, and 62d, of which 62b and 62d are inverted. In order to ensure filling of the waveguide with the input image 60, a slightly oversized input image should be trimmed to size on entry to into the waveguide 10. This ensures that the multiplied adjacent apertures will not overlap on the one hand, and will not have gaps on the other. The trimming of the image 60 is performed by the optical coupling-in configuration 80 as the image is injected into the waveguide 10 but before the image 60 is guided within the waveguide 10 by four-fold internal reflection.

With continued reference to FIGS. 1A-1C, refer now to FIGS. 3 and 4A-4C, which illustrates aspects of the optical aperture multiplier 1 and the optical coupling-in configuration 80 according to an embodiment of the present invention. It is noted that for simplicity of presentation, the facets 28 of the waveguide 20 are not illustrated in FIGS. 4A and 4C. Looking first at FIG. 3, the optical coupling-in configuration 80 is generally formed as a coupling prism having a plurality of surfaces (faces) including faces 81, 83, 85, 87, 89. The faces 81 and 83 are joined at a common edge 82, and the faces 81 and 85 are joined at a common edge 84. Vertex points 86 and 88 are at opposite ends of the edge 84, and are respectively formed as vertices of the faces 81, 85, 87 and the faces 81, 85, 89.

Turning now to FIGS. 4A-4C, the optical coupling-in configuration 80 is deployed in association with the waveguides 10, 20 such that the optical coupling-in configuration 80 adjoins the second region 46. In particular, the optical coupling-in configuration 80 is deployed in association with a portion of the face 14a that adjoins the second region 46. More specifically, the deployment is such that a first portion of the face 81 is associated with a portion of the front face 14a that is in the second waveguide region 13, and such that the remaining second portion of the face 81 is associated with a portion of the face 22a of the waveguide 20. In the illustrated embodiment, the vertex 88 is aligned with the plane P (i.e., if the plane P were to be extended into the waveguide 20, the vertex 88 would lie in the extended plane P).

The face 81 is a light-transmissive surface (i.e., a light entrance surface) through which light from the optical coupling-in configuration 80 enters (i.e. is transmitted into) the waveguide 10 (or waveguide 20), and therefore it is preferable that the face 81 is index matched to the faces 14a, 22a to prevent refraction of the injected image light upon entry to the waveguide. In certain embodiments, an index matching optical cement can be used to provide index matching and bonding between the face 81 and the waveguides 10, 20.

The optical coupling-in configuration 80 is configured and deployed such that all of the light within a desired angular field of view passes between the boundary 47 and the image of the boundary 47 (which presents an apparent input optical aperture) so as to enter the waveguide 10 and advance through the waveguide 10 by four-fold internal reflection. As will be discussed, this deployment ensures that the marginal rays of the desired angular field of view that enter the waveguide 10 are incident at points along the boundary 47.

FIG. 4A shows the footprint of the optical coupling-in configuration 80 in the plane of the faces 14a, 22a, and sets of collimated beams representing points in the collimated image 60. In the drawings, only one light ray of each beam set is shown for clarity, but representative of one of many parallel rays in the beams set. The solid ray 60A represents the beam at one edge of the projected field, whereas the dashed ray 60C represents the beam at the other edge of the projected field (these rays 60A, 60C are the "marginal rays"). The dot-dashed ray 60B represents the beam at the center of the field (i.e., the centroid of the image).

In the illustrated configuration, the coupling prism is simplified such that the edges 82, 82 are mutually parallel and such that the edge 84 is parallel to the extensional direction of the face 83, which is a light entrance surface of the prism. The coupling prism is preferably designed such that the light entrance face 83 is perpendicular (orthogonal) to the center beam (ray 60B) in order to reduce optical aberrations. In practice, the orientation of the face 83 is set according to the propagation direction of the central ray 60B (which is based on the position and spatial orientation of the optical image generator).

The configuration and deployment of the optical coupling-in configuration 80 enables the optical coupling-in configuration 80 to trim the input image, as will now be described with reference to FIGS. 4A-4C. As illustrated, the rays 60A, 60B, 60C enter the optical coupling-in configuration 80 via the face 83 at respective points 91a, 91b, 91c of the face 83, and then exit the optical coupling-in configuration 80 through the face 81 and enter one of the waveguides via respective points 93a, 93b, 93c. In the illustrated configuration, the points 93a and 93b are different respective points on the face 14a of the rectangular waveguide 10, and the point 93c is a point on the face 22a of the second waveguide 20. In other words, the rays 60A and 60B enter the waveguide 10 through different points on the face 14a, and the ray 60C enters the waveguide 20 through the face 22a.

After the rays 60A, 60B, 60C enter a waveguide at points 93a, 93b, 93c, the rays are trimmed in a first dimension (vertical dimension) by edge 86 such that the waveguide is uniformly illuminated in the vertical direction (along the y-axis in the drawings). The rays 60A, 60B, 60C are then trimmed in a second dimension orthogonal to the first dimension (i.e., laterally, along the z-axis in the drawings) at the boundary 47 such that all of the beams uniformly illuminate the waveguide 10 in the lateral dimension (z dimension). In particular, the ray 60A is reflected at a point 92 at the upper face 12a (that intersects with or is overlapped by the edge 84) onto a point on the boundary 47. The ray 60B is also reflected (at a different point) of the upper face 12a onto a point on the boundary 47, and the marginal ray 60C is transmitted into the waveguide 10 from the waveguide 20 via the face 12b through a point on the boundary 47. The trimmed image then advances through the waveguide 10 by four-fold internal reflection.

Conceptually, the boundary 47, together with its image, when viewed along an optical input axis along which the image 60 is to be introduced, present an apparent input optical aperture to the optical waveguide 10 across the entire desired angular field of view. The optical coupling-in configuration 80 trims the input image 60 such that all of the light within that field of view passes through the apparent input optical aperture (i.e., between the boundary 47 and the image of the boundary 47) so as to enter the waveguide 10 and advance through the waveguide 10 by four-fold internal reflection. Any other light rays that are not trimmed by the optical coupling-in configuration 80 do not pass through the apparent input optical aperture, and therefore do not enter the waveguide 10.

It is noted that the deployment and configuration of the optical coupling-in configuration 80 is preferably such that the surface 81 does not overlap with the projection of any of the facets 28 in the plane parallel to the faces 22a, 22b (which in the arbitrarily labeled coordinate system is the xy plane). This non-overlapping geometry and orientation helps to prevent situations in which light that is coupled out by one or more of the facets 28 is coupled back into the optical coupling-in configuration 80 which can re-introduce the coupled-out light back into the optical waveguide 10.

Figure 5:
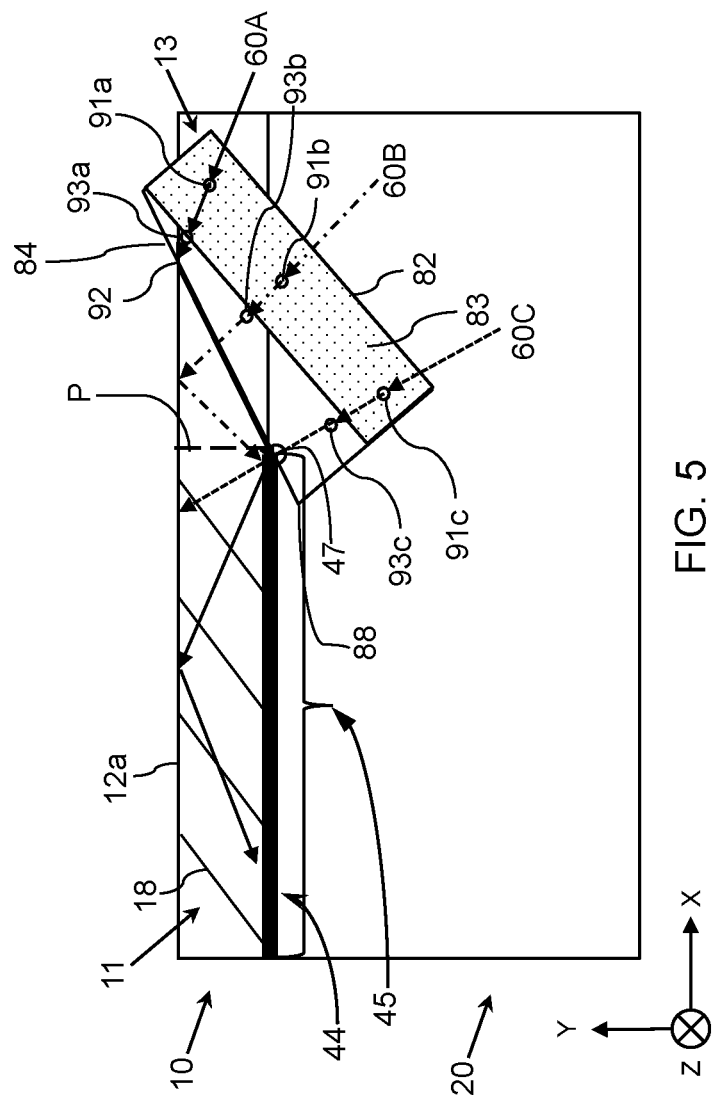
FIG. 5 is a schematic front view similar to FIG. 4A, showing a variation of the optical coupling-in configuration, according to embodiments of the present invention.

FIG. 5 illustrates a configuration of the optical coupling-in configuration 80 according to another embodiment of the present invention. Here, the edge 86 is non-parallel to the edge 82 and face 83 and is located close to the reflected ray that is reflected from the point 92. In addition, the vertex 88 is not aligned with the plane P as in FIGS. 4A and 4C, but instead extends past the boundary 47 such that the projection of the vertex 88 in the xz plane projects into the first region 45.

The configuration illustrated in FIG. 5 provides an advantage over the configuration illustrated in FIGS. 3-4C, most notably be allowing the face 83 to be positioned closer to the waveguide faces 14a, 22a than what is allowed in the configuration illustrated in FIGS. 3-4C. This in turn allows the image projector (optical image generator) to be positioned closer to the waveguide 10 thereby enabling use of an image projector that is smaller than what should be used in the configuration illustrated in FIGS. 3-4C. As in the configuration illustrated in FIGS. 3-4C, the injected rays are trimmed in the vertical dimension by the edge 86, and then trimmed in the lateral dimension by at boundary 47.

The optical coupling-in configurations illustrated in FIGS. 4A-5 are deployed to accommodate placement of the image projector at the front face 14a in a spatial orientation that illuminates the optical coupling-in configuration from below (a "bottom-up" configuration, as most easily seen in FIG. 4B). However, the optical coupling-in configuration can also be deployed to accommodate illumination from above (a "top-down" configuration), for example as illustrated in FIGS. 6A and 6B. Here, the optical coupling-in configuration is in an inverted spatial orientation relative to that which is illustrated in FIGS. 4A and 4B. In this deployment configuration, the face 12a is subdivided into non-overlapping first and second regions 55, 56 that have respective first and second optical characteristics. The first optical characteristic is a reflective characteristic which preserves conditions of internal reflection, such that light reflected from one of the faces 12b, 14a, 14b that is incident to portions of the face 12a in the region 55 is reflected at the face 12a (so as continue propagation through the waveguide 10 by internal reflection). The second optical characteristic, which is different from the first optical characteristic, is a transmissive characteristic, such that light from the optical coupling-in configuration 80 can enter the waveguide 10 via transmission through a portion of the waveguide 10 that adjoins the region 56.

The first region 55 occupies (i.e., extends along) the majority, but not the entirety, of the face 12a along the direction of elongation, whereas the second region 56 occupies (extends along) the remaining minority portion of the face 12a along the direction of elongation. The region 55 is preferably at least 70% of the face 12a in the direction of elongation, however, the particular amount of the extension in the direction of elongation may be based on the optical design specification of the optical aperture multiplier, in particular the size and deployment position of the optical coupling-in configuration 80, as will be discussed in subsequent sections of the present disclosure. In certain cases, the amount of the extension in the direction of elongation may be at least 80% or at least 90%.

In certain embodiments, the subdivision is effectuated by a coating or material 54 that is deployed in association with the face 12a in a manner similar to that of the coating or material 44. Specifically, the coating or material 54 is deployed in association with a majority portion of the face 12a that extends along the majority, but not the entirety, of the face 12a in the direction of elongation. The extension of the coating or material 54 is also preferably along the entirety of the face 12a in the transverse (or lateral) direction. The deployment of the coating or material 54 subdivides the face 12a into non-overlapping first and second regions 55, 56 that have respective first and second optical characteristics, whereby the first region 55 of the face 12a is associated with the material or coating 54, and the second region 56 of the face 12a is not associated with the material or coating 54.

As before, the optical waveguide 10 is subdivided into the first and second waveguide regions 11, 13 by the rectangular cross-sectional plane P that passes through the boundary 57 between the two regions 55, 56. The top face of the first waveguide region 11 is the first region 55 of the face 12a (in other words the first region 55 corresponds to the first waveguide region 11), and the top face of the second waveguide region 13 is the second region 56 of the face 12a (in other words the second region 56 corresponds to the second waveguide region 13).

The coating or material 54 can be implemented in various ways. In one example, a metallic coating is applied to the majority of the face 12a. In another example, a low refractive index material or coating (such as Aerogel materials or low index optical cement is applied to the majority of the face 12a. associated with the remaining minority portion of the face 12b so as to extend along the minority portion (region 46) of the face 12b. In other embodiments, the material 54 is the material itself from which the substrate 30 is constructed, which has a refractive index less than the refractive index of the waveguide 10 such that internal reflection at the face 12a is preserved.

In the embodiment illustrated in FIGS. 6A and 6B, the coating or material 54 is located at an interface 50 between the optical waveguide 10 and another optical substrate 30 (also formed form a light-transmitting material). The optical substrate 30 has a pair of faces 32a, 32b (which can be parallel) and a pair of parallel faces 34a, 34b (and can also include an additional pair of faces 36a, 36b), and the waveguide 10 is optically coupled with the substrate 30 at the interface 50 which is formed between the faces 12a, 32b (i.e., the optical coupling between the waveguide 10 and the substrate 30 defines the interface 50 that is formed between the faces 12a, 32b). The coating or material 54 can alternatively be applied to the requisite majority portion of the face 32b.

Similar to as in the configuration illustrated in FIGS. 3 and 4A-4C, the optical coupling-in configuration illustrated in FIGS. 6A and 6B is deployed in association with the waveguides 10, 20 such that the optical coupling-in configuration 80 adjoins the second region 56. In particular, the optical coupling-in configuration 80 is deployed in association with a portion of the face 14b that adjoins the second region 56. More specifically, the deployment is such that a first portion of the face 81 is associated with a portion of the front face 14a that is in the second waveguide region 13, and such that the remaining second portion of the face 81 is associated with a portion of the face 34a of the substrate 30. Also, in the illustrated embodiment, the vertex 88 is aligned with the plane P (i.e., if the plane P were to be extended into the waveguide 20, the vertex 88 would lie in the extended plane P).

The behavior of the rays 60A, 60B, 60C in FIGS. 6A and 6B is similar to as described above with reference to FIGS. 4A-4C, with minor differences. Here, the ray 60C enters the substrate 30 at the point 93c on the face 34a. After the rays 60A, 60B enter the waveguide 10 and the ray 60C enters the substrate (at points 93a, 93b, 93c), the rays are trimmed by edge 86 such that the waveguide 10 is uniformly illuminated in the vertical direction (along the y-axis in the drawings). The rays 60A, 60B, 60C are then trimmed laterally (along the z-axis in the drawings) at the boundary 57 such that all of the beams uniformly illuminate the waveguide 10 in the lateral dimension (z dimension). In particular, the ray 60A is reflected at a point 92 at the lower face 12b (that intersects with or is overlapped by the edge 84) onto a point on the boundary 57. The ray 60B is also reflected (at a different point) of the lower face 12b onto a point on the boundary 57, and the marginal ray 60C is transmitted into the waveguide 10 from the substrate 30 via the face 12a through a point on the boundary 57.

It is noted that in the top-down configuration illustrated in FIGS. 6A and 6B, it may be possible to further reduce the distance between the optical image generator (image projector) and the waveguide 10 by polishing the face 83 along a polishing plane (designated by dashed line 95 in FIG. 6B), thereby further reducing the size of the projecting optics. The polishing plane 95 is generally parallel to the face 83 of the coupling prism 80, and passes approximately through the point 93c (i.e., where the beam 60C enters the substrate 30). As a result, the polished surface 83 can be made to be approximately flush or coincident with the substrate 30 at point 93c. In certain embodiments, the "polishing" can be performed by polishing the coupling prism 80 using a suitable polishing apparatus or tool, or grinding/cutting the coupling prism 80 with a suitable grinding/cutting apparatus or tool and then polishing the cut surface.

As should be apparent, an inverted variation of the configuration illustrated in FIG. 5 can be deployed in accordance with embodiments of the optical waveguide 10 having coating or material 54 at the face 12a in a manner similar to as described with reference to FIGS. 6A and 6B.

In addition to transmitting some of the image light via the prism into the waveguide 10, the substrate 30 can also provide structural and and/or bonding support to the optical coupling-in configuration, for example by allowing bonding (via index matched optical adhesive) between portions of the face 81 and portions of the face 34a. It is also noted that although the substrate 30 is represented here as having parallel faces 36a, 36b that are coincident and parallel to faces 16a, 26a and 16b, 26b, the substrate 30 can be reduced in size such that the substrate is only located at portions of the waveguide 10 that adjoin the region 56. In such reduced-size embodiments, the face 36a can lie at or just before the vertex 88 of the optical coupling-in configuration. Although the embodiments of the optical coupling-in configuration described thus far have pertained to a non-limiting implementation as a coupling prism having a light entrance face 83 that receives light 60 from an optical image generator (deployed in association with the front face 14a), other embodiments are contemplated herein in which the optical coupling-in configuration operates as a coupling reflector. In such embodiments, the face 83 is a reflective face, and the optical coupling-in configuration 80 is deployed in association with the waveguides 10, 20 (or the waveguide 10 and substrate 30) such that a portion of the face 81 adjoins the second region 46/57 and in particular such that a first portion of the face 81 is associated with a portion of the back face 14b that is in the second waveguide region 13, and such that the remaining second portion of the face 81 is associated with a portion of the face 22b of the waveguide 20 (or the face 34b of the substrate 30).

The operating principles of the optical coupling-in configuration in such reflective embodiments are generally similar to as described above with reference to FIGS. 3 and 4A-6B, with a few minor differences. To more clearly illustrate these differences, FIGS. 7A and 7B illustrate variations of FIGS. 4B and 4C, respectively, in which the optical coupling-in configuration is configured with a reflective face 83. One difference is that the rays enter the prism through the face 81 instead of the face 83 (i.e., the face 81 receives the collimated image from the optical image generator). Another difference is that the points 91a, 91b, 91c on the face 83 at which the rays enter the prism in FIGS. 4A-6B are instead points on the face 83 at which the rays are reflected back toward the face 81 so as to be trimmed by the edge 84.

Lastly, in order to accommodate deployment of the image projector in association with the front face 14a, the optical coupling-in configuration 80 of FIGS. 7A and 7B is deployed in association with the back face 14b. In particular, the optical coupling-in configuration 80 is deployed in association with a portion of the face 14b that adjoins the second region 46. This deployment configuration of the optical coupling-in configuration on the back face 14b (i.e., away from the user's eye) provides certain ergonomic advantages. However, this also entails placement of the optical coupling-in configuration farther away from the optical image generator, which therefore can require using an optical image generator that is larger than what should be used in the transmissive prism configurations illustrated in FIGS. 3 and 4A-6B.

The optical coupling-in configurations illustrated in FIGS. 3-7B represent one set of solutions according to embodiments of the present invention that can achieve filling of the optical waveguide 10 with the injected aperture of the light beam 60.

FIGS. 8A and 8B illustrate another embodiment of an optical aperture multiplier, in which aperture filling can be achieved or aided by using a partially reflective surface 94 deployed in a region of the waveguides between the facets 18, 28. The partially reflective surface 94 is deployed parallel to the faces 14a, 14b, 22a, 22b and is preferably at the mid-plane between the face 14a (or 22a) and 14b (or 22b). In addition, the partially reflective surface 94 is in a region that is absent from facets 18, 28. In this embodiment, the partially reflective surface 94 is actually deployed in an interface region 70 of the interface 40 that is formed from a light-transmitting material (substrate). The interface region 70 includes three pairs of faces 72a, 72b, 74a, 74b, 76a, 76b, and the faces 74a, 74b, 76a, 76b are pairs of parallel faces which together form a rectangular cross-section. The faces 72a, 72b may also be parallel faces, in which case the three pairs of faces 72a, 72b, 74a, 74b, 76a, 76b can be mutually orthogonal. Preferably, the faces 74a and 74b are parallel to faces 12a, 24a, 32a and 12b, 24b, 32b, respectively, and the faces 76a and 76b are parallel to faces 14a, 22a, 34a and 14b, 22b, 34b, respectively. Similarly, the faces 72a and 72b are preferably parallel to faces 16a, 26a, 36a and 16b, 26b, 36b, respectively. In the illustrated embodiment, the material or coating 44 applied to either or both of faces 12b, 24a in the previously described embodiments is instead applied to either or both of faces 12b, 74a. In addition, a selectively reflective coating 78 can be applied to either or both of faces 24a, 74b so as to extend along the entirety (or majority) of the faces 24a, 74b in the direction of elongation.

The configuration of the partially reflective surface 94 is such that, when the image is coupled out of the waveguide 10, a proportion of the intensity of the coupled-out image is reflected at the partially reflective surface 94 prior to entering the second waveguide 20, thereby ensuring that conjugate beam vectors 64a, 64b are generated and fill the aperture in the waveguide 20.

Additional discussion of partially reflective surfaces (beamsplitter surfaces) deployed parallel to major surfaces of waveguides for ensuring filling of the waveguide aperture can be found in the commonly owned PCT patent publication WO2021001841A1.

The embodiments described thus far have pertained to optical aperture multipliers that employ rectangular optical waveguides (optical waveguide 10) having associated therewith an optical coupling-out configuration implemented as a set of mutually parallel partially reflective surfaces (facets) 18 internal to the waveguide 10. However, as alluded to above, other types of coupling-out arrangements that function to couple propagating light out of the rectangular waveguide are contemplated, including optical coupling-out configurations in the form of a partially reflective surface that is associated with, and parallel to, the bottom face of the rectangular waveguide, and that is located at the interface between the two waveguides 10, 20. Examples of implementations of materials or coatings that can be applied at the interface 40 (and which extend along the entirety or a majority portion of the faces 12b, 24a) to form such a partially reflective surface have been discussed above with respect to the material or coating 44. The following paragraphs describe an optical aperture multiplier, according to embodiments of a second aspect of the present invention, having a rectangular optical waveguide that does not include any oblique facets, but instead employs a partially reflective surface associated with, and parallel to, the bottom face of the rectangular waveguide to perform the optical coupling-out functionality.

Bearing the above in mind, attention is now directed to FIGS. 9A and 9B, which illustrate an optical aperture according to an embodiment of the second aspect of the present invention. In the illustrated embodiment, the face 12b is associated with a partially reflective surface 96 (at the interface 40). The optical coupling between the optical waveguides 10, 20, and the deployment and configuration of partially reflective surfaces 96 are such that, when image light 60 is coupled into the optical waveguide 10 with an initial direction of propagation at a coupling angle oblique to both the first and second pairs of parallel faces 12a, 12b, 14a, 14b, the image advances by four-fold internal reflection along optical waveguide 10 as previously described (i.e., conjugate images 62a, 62b, 62c, 62d are generated), with a proportion of the intensity of the image (say for example 62d) being transmitted at the partially reflective surface 96 so as to be coupled into the optical waveguide 20, and then propagates through two-fold internal reflection (images 64a, 64b) within the optical waveguide 20, with a proportion of intensity of the image reflected (deflected) at the partially reflective surfaces 28 so as to be directed outwards from one of the parallel faces 22a as a visible image 66.

In FIG. 9A, two sample image light beams 60a, 60b of the image 60 are shown as entering the optical waveguide 10. The beams 60a, 60b represent a part of an extremity of the FOV corresponding to two sample beams of the same pixel of the generated image at two extremity angles. Both of the beams 60a, 60b advance by four-fold internal reflection at the faces 12a, 12b, 14a, 14b as previously described (i.e., both beams generate conjugate images 62a, 62b, 62c, 62d), with a proportion of the intensity from each of the beams being transmitted at the partially reflective surface 96 so as to be coupled into the optical waveguide 20. The image (64a, 64b) then advances by two-fold internal reflection at the faces 22a, 22b of the second waveguide 20, with a proportion of the intensity of the image reflected (deflected) at the partially reflective surfaces 28 so as to be directed outwards from one of the parallel faces 22a as a visible image 66 (in this case corresponding to the injected beams 60a, 60b reaching the lower corners of the EMB 3). The angle of the light beam 60 that is injected into the optical waveguide 10 is set to reflect from all four external faces 12a, 12b, 14a, 14b of the optical waveguide 10. The light beam should partially reflect from the bottom face 12b (and/or the partially reflective surface 96) at shallow (grazing) angles, and therefore should partially transmit from the optical waveguide 10 into the optical waveguide 20 at steep angles. In other words, a proportion of the intensity of the beam should be transmitted at the face 12b/partially reflective surface 96/interface 40 into the waveguide 20, and a proportion of the intensity of the beam should be reflected at the face 12b/partially reflective surface 96/interface 40 to continue advancing through the waveguide 10 by internal reflection. This property of partial transmission/reflection can be achieved by the material or coating 44 deployed at the faces 12b, 24a in order to form the partially reflective surface 96. Parenthetically, the beams are injected by an optical coupling-in configuration (not shown), which in the present embodiment is implemented as a coupling arrangement that provides side illumination injection. An example of a coupling-in configuration that provides side illumination will be provided in subsequent sections of the present disclosure, for example with reference to FIGS. 19A-21B, 23A, 23B, 25A, and 25B. To this end, the entirety of the interface 40 can include the aforementioned partially reflective surface 96, i.e., the material or coating 44 can extend along the entirety of the face 12b in the direction of elongation. It is noted, however, that other embodiments that employ front/back injection by way of the previously described optical coupling-in configuration 80 will also be presented herein with reference to FIGS. 11-16.

Returning now to FIGS. 9A and 9B, since the face 12b is effectively a partially reflective surface each time light (e.g., image 62d) impinges on the face 12b a proportion of the intensity of the light is transmitted through the face 12b and into the optical waveguide 20, with the remaining proportion of the intensity being reflected at the face 12b and continuing to advance through the optical waveguide 10. Thus, each transmission/reflection at the face 12b decreases the overall intensity of the propagating image, and therefore it may be desirable to reduce or the number of reflections (without sacrificing aperture expansion of the image) to improve light efficiency. One way to improve the light efficiency is shown in the embodiment illustrated in FIG. 10, in which the optical waveguide 10 is oriented at an angle (i.e., inclined) relative to the optical waveguide 20. In particular, the faces 12a, 12b are inclined obliquely to the face 24b. Inclination angles in the range of 5°-45° have been found to be particularly suitable for increasing light efficiency without negatively impacting aperture expansion. In the illustrated embodiment, the direction of elongation of the optical waveguide 10 is no longer along the x-axis, but rather is along a direction that is inclined relative to the x-axis by the inclination angle of the faces 12a, 12b relative to the face 24b.

Figure 11:
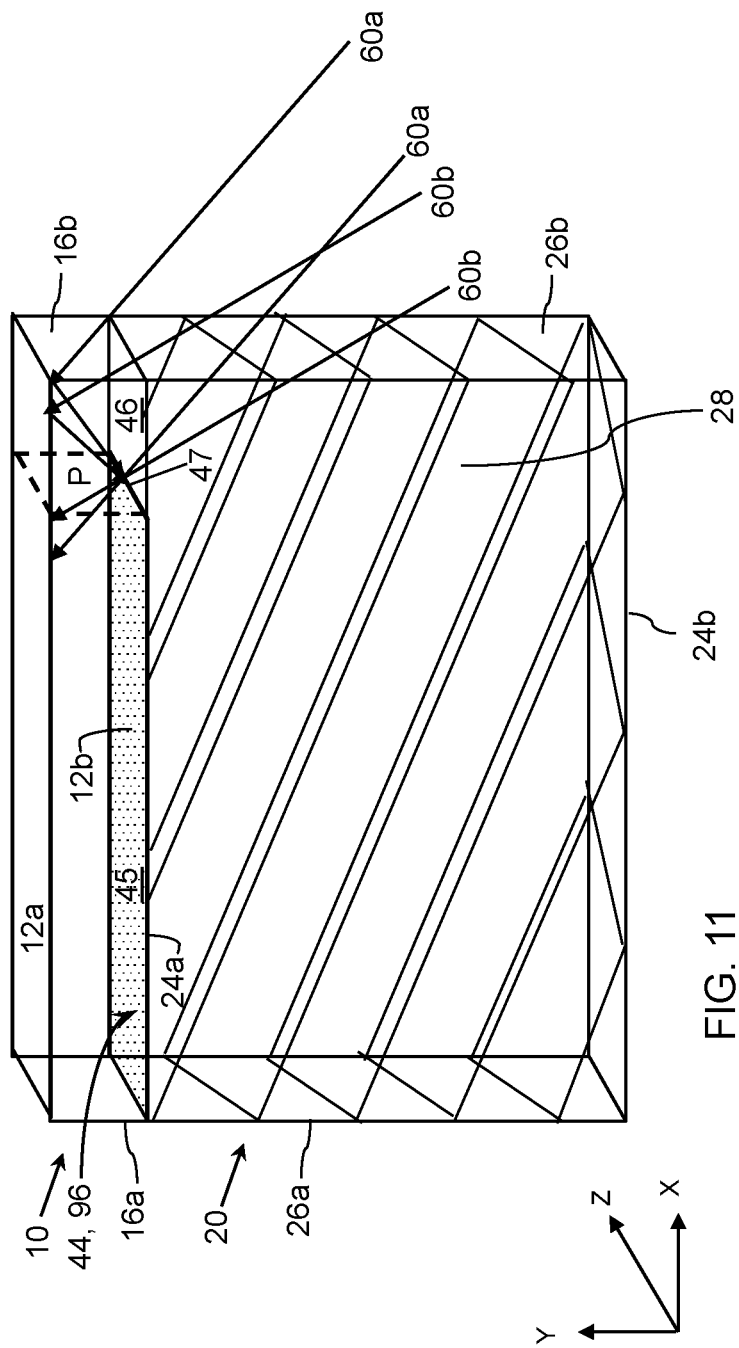
FIG. 11 is a schematic isometric view illustrating an optical aperture multiplier similar to the optical aperture multiplier of FIG. 9A, and in which the interface region between the two optical waveguides has a material or coating that extends along the majority but not the entirety of the faces that interface between the two optical waveguides to accommodate deployment of the optical coupling-in configuration of FIG. 3, according to an embodiment of the present invention.

Turning now to FIG. 11, there is illustrated an isometric view of an optical aperture multiplier according to another embodiment of the present invention, that is similar to the embodiment illustrated in FIG. 9A, but in which the partially reflective surface 96 extends along the majority, but not the entirety, of the face 12b to accommodate use with the optical coupling-in configuration 80 of FIGS. 3-5, 7A and 7B. In particularly preferred but non-limiting implementations, the partially reflective surface 96 is implemented as a selectively reflective coating that is applied to the face 12b prior to coupling the optical waveguides 10, 20. Here, the partially reflective surface 96 extends along the majority portion 45 of the face 12b (in the direction of elongation). The coupling-in region 46 (or "uncoated portion") of the face 12b corresponds to the remaining minority portion of the face 12b (proximal to the side faces 16b, 26b). Here, the image light 60a, 60b enters the optical waveguide 10 through the uncoated portion 46. The plane P and the critical boundary 47 that separates the two portions 45, 46 are more clearly illustrated in this isometric view.

It is noted that embodiments are contemplated herein in which the embodiments described with reference to FIG. 11 employs the "top-down" coupling-in configuration illustrated in FIGS. 6A and 6B. In such embodiments, coating or material 54 is deployed to extend along the majority of the face 12a, as described above.

Figure 12:
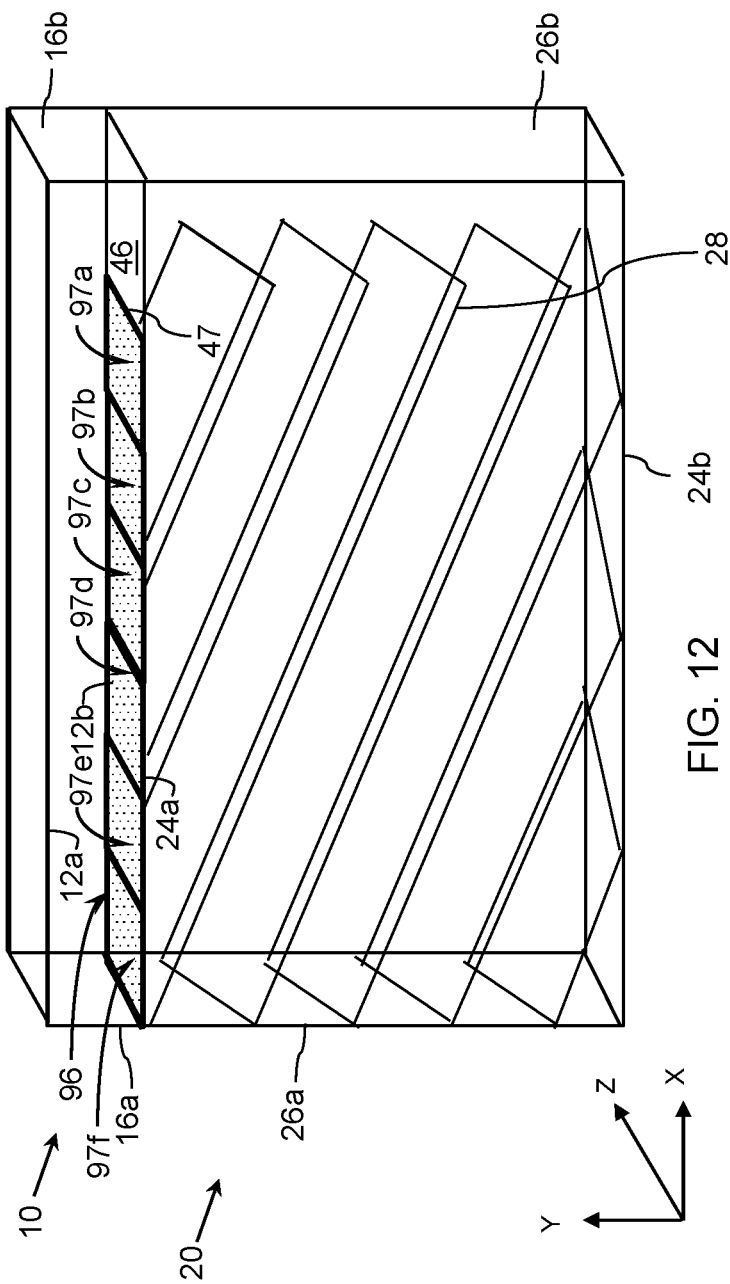
FIG. 12 is a schematic isometric view illustrating an optical aperture multiplier similar to the optical aperture multiplier represented in FIG. 11, but in which the partially reflective surface that is associated with the coupling face of the rectangular optical waveguide is divided into a plurality of non-overlapping regions having different reflectivity at each region, according to an embodiment of the present invention.

As previously discussed, in embodiments in which the optical coupling-out configuration of the optical waveguide 10 is implemented as a set of oblique facets 18, it may preferable to design the facets 18 such that the reflectivity of the facets 18 decreases along the direction of propagation of light through the optical waveguide 10, in order to provide a gradual increase in the intensity of light coupled into the optical waveguide 20. In the same sense, it may be preferable to design the partially reflective surface 96 such that the reflectivity of the partially reflective surface 96 decreases (and by equivalence the transmissivity increases) along the direction of propagation of light through the optical waveguide 10. FIG. 12 illustrates an embodiment of such an optical aperture multiplier, in which the decrease in reflectivity is achieved by dividing the partially reflective surface 96 into a plurality of regions (preferably discrete, non-overlapping regions) 97a, 97b, 97c, 97d, 97e, 97f along the direction of propagation of light through the optical waveguide 10 (which is the direction of elongation, i.e., along the x-axis in the arbitrarily labeled xyz coordinate system), where the reflectivity of the regions 97a, 97b, 97c, 97d, 97e, 97f decreases along the direction of propagation of light through the optical waveguide 10. In the illustrated embodiment, six discrete regions 97a, 97b, 97c, 97d, 97e, 97f are illustrated for exemplary purposes, however, it should be understood that any suitable number of regions can be employed. The variation in reflectivity can be provided by suitable reflective coatings applied at the face 12b (or at the face 24a in certain, sometimes less preferred, implementations).

In order to ensure that a uniform beam is coupled into the optical waveguide 20 (from the rectangular waveguide 10), the reflective coating that forms the partially reflective surface 96 should preferably be designed such that the reflectivity varies across the length of face 12b (and therefore across the interface 40) in the direction of elongation of the waveguide 10. Here, the reflectivity refers to the reflection of unpolarized light averaged across at least a majority portion of the visible light region of the electromagnetic spectrum, where the "majority portion" preferably at least covers wavelength in the range of 430-660 nanometers (nm), but may also include wavelengths up to 750 nm. The reflective coating should have color neutral reflection and transmission characteristics, such that incident light beams do not undergo any change in color due to reflection at the partially reflective surface 96.

In certain embodiments, the reflective coating is a multilayer coating that is designed such that reflectivity variation across the length of the face 12b (i.e., across the interface 40) is preferably between 50%-80% (with as low absorption as possible) at AOIs in the range of 35°–55°. In one set of non-limiting implementations, the multilayer coating is formed from a metal (e.g., silver) layer and one or more dielectric coating layer, where the variation in reflectivity is dictated by the thickness of metal layer dictates. In another set of non-limiting implementations, the multilayer coating is formed from a metal (e.g., silver) layer and one or more dielectric coating layer, where the variation in reflectivity is dictated by adjusting the thickness of each of the metal layer and the dielectric coating layer(s) by a predetermined factor. In yet another set of non-limiting implementations, the multilayer coating is formed from multiple dielectric coating layers without any metallic layer. When using a dielectric only multilayer coating, the thickness of the borders between adjacent layers should preferably be kept as small as possible, which can be achieved using masking methods. As will be discussed in subsequent sections of the present disclosure, particularly preferred embodiments employ a dielectric only multilayer coating as part of a polarized light injection scheme.

It is noted that using a multilayer coating with a silver layer of thickness in the range of 15-35 nm will typically yield light absorption in the silver layer in a range of around 4%-8%. The number of layers used in the multilayer coating can be relatively small, from between 2-7 layers, providing an advantage in that the reflectivity and transmissivity can be relatively "flat" in the visible light region of the electromagnetic spectrum, resulting in color neutral reflection and transmission of light. It is also noted that using a multilayer coating without any metallic layer (i.e., only dielectric material layers) can provide low absorption, typically less than around 5%. The number of layers required to achieve the desired reflectivity in a dielectric only multilayer coating (by varying the layer thickness) usually does not conserve the flatness of the coating, which can result in color-dependent reflection and transmission.

Figure 13:
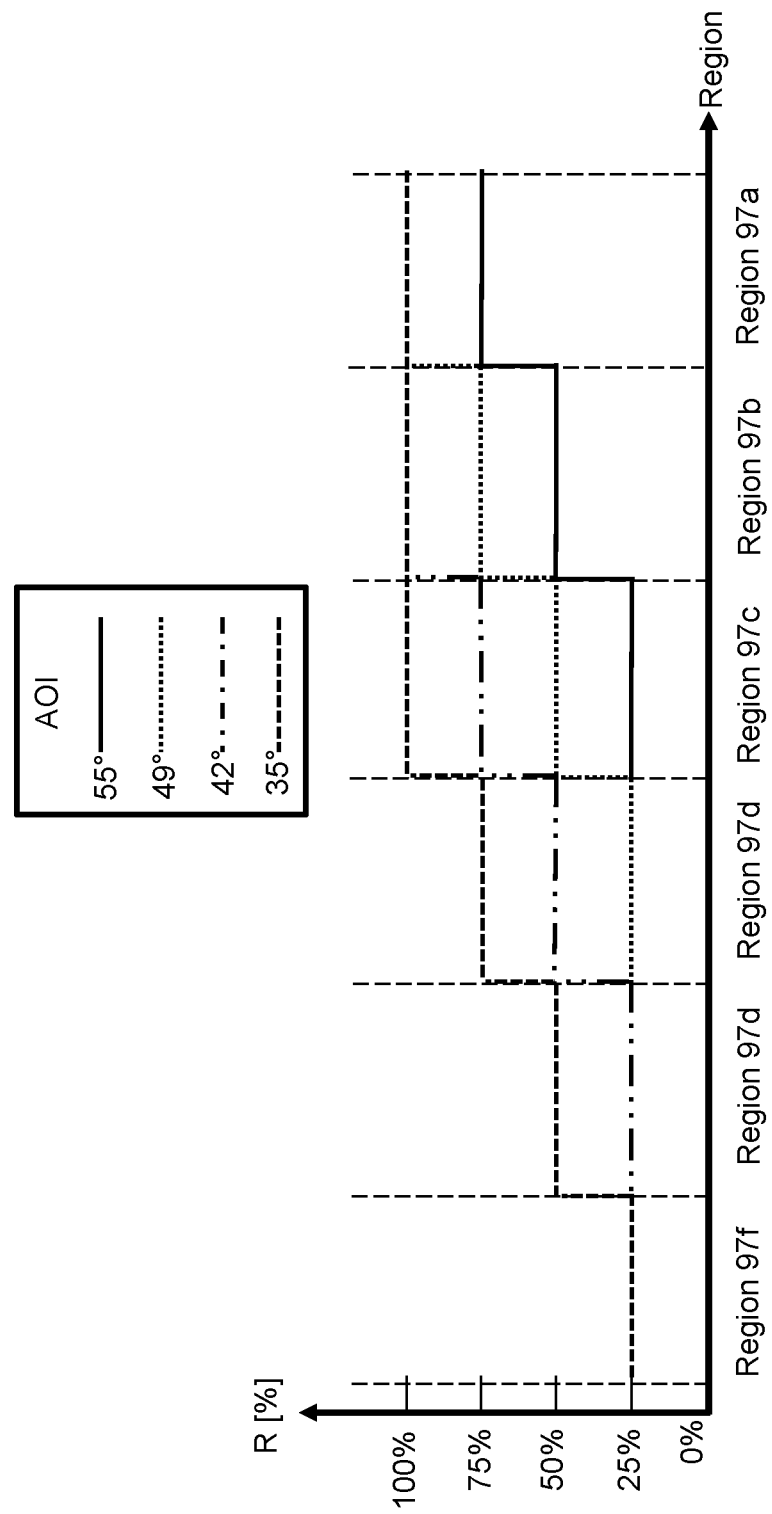
FIG. 13 is a graph of example reflectivity of the regions of FIG. 12 at four example angles of incidence (AOIs)

FIG. 13 shows a reflectivity graph for an example multilayer coating across the six regions 97a, 97b, 97c, 97d, 97e, 97f at four example AOIs (35°, 42°, 49°, and 55°). Light that is incident to the partially reflective surface 96 at higher AOIs, for example 55°, exit the optical waveguide 10 sooner than light that is incident to the partially reflective surface 96 at lower AOIs. Thus, region 97a is designed with high reflectivity (low transmission) for lower AOIs, and lower reflectivity (higher transmission) for higher AOIs (e.g., 55°). The transmission of higher AOIs gradually decreases in regions 97b and 97c, and is such that light at higher AOIs is practically not transmitted (i.e., practically fully reflected) in regions 97d, 97e, and 97f. Transmission of light at the next highest AOI (e.g., 49°) begins at region 97b, where the transmission is the highest, and then gradually decreases in regions 97c and 97d, and is such that light at such AOIs is practically not transmitted (i.e., practically fully reflected) in regions 97e and 97f. Transmission of light at the next highest AOI— or second to lowest AOI— (e.g., 42°) begins at region 97c, where the transmission is the highest, and then gradually decreases in regions 97d and 97e, and is such that light at such AOIs is practically not transmitted (i.e., practically fully reflected) in region 97f. Transmission of light at the lowest AOI (e.g., 35°) only begins at region 97d, where the transmission is the highest, and then gradually decreases in regions 97e and 97f, where the transmission is lowest, but still non-zero, in region 97f.

In other embodiments, the partially reflective surface 96 is formed by coating the face 12b with a dielectric coating. Dielectric coatings have low reflectivity for incident light that is polarized in a first polarization direction (e.g., p-polarized light) and has high reflectivity for incident light that is polarized in a second polarization direction that is the orthogonal to the first polarization direction (e.g., s-polarized light). As light that is coupled into the optical waveguide 10 with initial polarization in the second polarization direction (e.g., s-polarized light) advances through the optical waveguide by four-fold internal reflection, the four-fold internal reflection preserves the polarization direction of the propagating light with regard to the partially reflective surface 96 such that the s-polarized light is transmitted at the partially reflective surface 96 into the waveguide 10. Design of coatings according to particular polarization schemes will later be discussed in detail within the context of the second set of embodiments (FIGS. 15A-22) according to the second aspect of the present invention, which will be described in subsequent sections of the present disclosure.

It is generally noted that in order for the image to fill the aperture of the optical waveguide 20, both the image and its conjugate must be present in the waveguide 20 (i.e., both images 64a and 64b). One way to achieve aperture filling of the lower waveguide 20 is by having both the image and its conjugates (i.e., the four conjugate beam vectors 62a, 62b, 62c, 62d) propagate through the waveguide 10, and by having both an image and its conjugate (for example both 62a and 62b) coupled into the lower waveguide 20. However, if the angular orientation of the faces 12a, 12b, 14a, 14b is such that the faces 12a, 12b are not parallel and/or the faces 14a, 14b are not parallel and/or one or both of the faces 12a, 12b is not perpendicular to one or both of the faces 14a, 14b, the image and the conjugated image are shifted angularly in opposite directions upon reflection from a non-perpendicular surface. After several reflections from a non-perpendicular surface, the angular shifts accumulate. Therefore, even a slight manufacturing error leading to a deviation in parallelism or perpendicularity could introduce a significant angular difference between the image and the conjugated image, which can give rise to ghost image and/or reduced optical resolution. As a result, the manufacturing tolerance on parallelism and perpendicularity are extremely strict.

Figure 14:
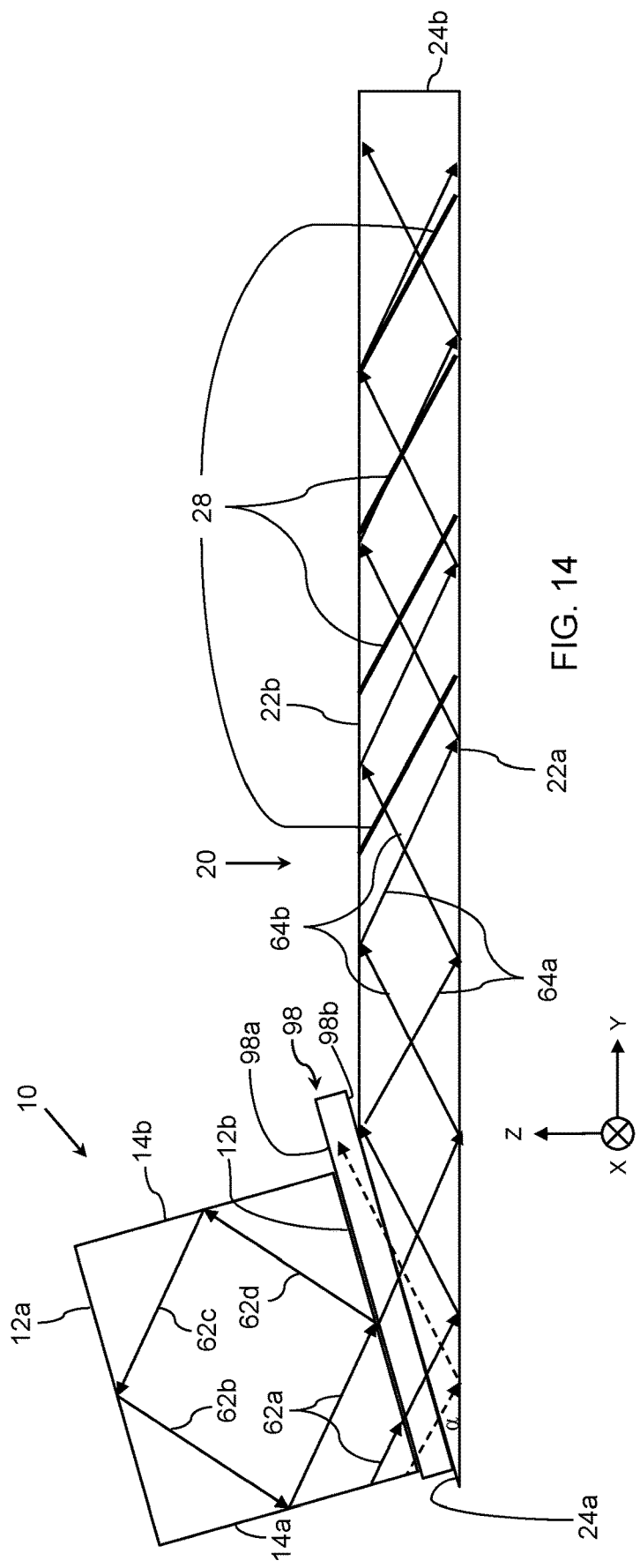
FIG. 14 is a schematic side view illustrating an optical aperture multiplier in which the rectangular optical waveguide is inclined relative to the second optical waveguide such that only one of the images coupled out from the rectangular optical waveguide is coupled into the second optical waveguide, according to an embodiment of the present invention.

FIG. 14 illustrates an embodiment that improves the strict manufacturing tolerances for aperture filling by inclining the optical waveguide 10 relative to the optical waveguide 20 so that only one of the images (rather than both the image and its conjugate) coupled-out from the waveguide 10 is coupled into the waveguide 20 so as to be contained and guided within the waveguide 20. In the non-limiting implementation illustrated in FIG. 14, the required inclination angle of the waveguide 10 relative to the waveguide 20 matches the angle α of the second waveguide coupling surface (face 24a), which is inclined by a relative to the face 22a. In other words, the waveguide 10 is inclined such that the face 12b is inclined obliquely (by the angle α) relative to the face 22a. This inclination is chosen so as to couple one image (say for example 62a) from the waveguide 10 and not to couple the other image from the waveguide 10, and such that the rays of the coupled-in image are reflected at the face 22a and then reflected at the face 22b, thereby generating conjugate image pair 64a, 64b and filling the aperture in the lower waveguide 20. In preferred embodiments, an intermediate window 98, formed as a light-transmitting optical element having faces 98a, 98b, is deployed between the waveguides 10, 20 to provide the optical coupling between the waveguides 10, 20 and to prevent ghost images (resultant from unwanted reflections at the face 24a). The intermediate window 98 is deployed so as to project beyond the input aperture of the waveguide 20. In the illustrated embodiment, this deployment is such that the face 98a is parallel to the face 12b and extends beyond the entirety of the face 12b, and the face 98b is parallel to the face 24a and preferably also extends beyond the entirety of the face 12b (and extends across the entirety, close to the entirety, or beyond the entirety of the face 24a). In certain embodiments, the intermediate window 98 can be a refractive layer. Some of the image light that is coupled out from the waveguide 10 passes through the intermediate window 98 and is coupled into the waveguide 20, whereas some of the image light that is coupled out from the waveguide 10 passes through the intermediate window 98 but is not coupled into the waveguide 20. In particular, the beams (solid arrows) that pass through the intermediate window 98 to enter the waveguide 20 and reflect at the face 22a and then reflect at the face 22b are coupled into the waveguide 20 so as to be guided through the waveguide 20 by (total) internal reflection at the faces 22a, 22b. However, the beams (dashed arrow) that pass through the intermediate window 98 and enter the waveguide 20 but reflect at face 22a back toward the intermediate window 98 are not coupled into the waveguide 20. Instead, these beams that are reflected back toward the intermediate window 98 re-enter the intermediate window 98 via the inclined (slanted) surface 24a and the face 98b, and are preferably coupled out through an edge or side surface of the intermediate window 98. In certain embodiments, a light absorber (not shown) can be placed at the coupling-out edge/surface of the transparent window 98 to absorb the extraneous light. In certain embodiments, the light absorber can be effectuated by coating the coupling-out edge/surface of the intermediate window 98 with a light absorbing material. The intermediate window 98 can have any suitable geometry, so long as faces 98a, 98b are parallel to the faces 12b, 24a and project beyond the input aperture of the waveguide 20. For example, in another implementation, the intermediate window 98 can take the form of an intermediate wedge, which can also be used to mount the waveguide 10 at the required inclination angle relative to the waveguide 20.

A similar effect can be produced by introducing at least one partially reflective surface that is parallel to the faces 22a, 22b in the interface between the two waveguides 10, 20 (similar to as illustrated in FIGS. 8A and 8B, and as described in PCT patent publication WO2021001841A1). Employing this coupling-in method, in which only one of the images is introduced into the waveguide 20, requires a smaller coupling-in aperture with significantly higher optical efficiency. The relative reduction in aperture size and relative improvement in efficiency scale with FOV, and can typically reach a factor of ~2 for FOV around 50°–60° along the diagonal.

With continued reference to FIGS. 1A-14, refer now to FIGS. 15A and 15B, which illustrate an optical aperture according to an embodiment of the second aspect of the present invention. The optical aperture multiplier in the embodiment illustrated in FIGS. 15A and 15B is similar to the optical aperture multipliers previously described with reference to FIGS. 9A-14, with several notable differences.

First, the optical aperture multiplier in FIGS. 15A and 15B is configured to operate with a coupling prism 100 that introduces the collimated image 60 into the optical waveguide 10 via side illumination. Similar to the optical coupling-in configuration 80 described above, the coupling prism 100 is configured to trim the input image on entry to into the waveguide 10. The coupling prism 100 is only generically illustrated in FIG. 15A, but can take various forms which provide image injection and trimming Details of the structure and operation of such coupling prisms can be found in various publications by Lumus Ltd (Israel), including commonly owned U.S. Pat. No. 10,133,070, which is incorporated by reference in its entirety herein.

Another notable difference is that the optical aperture multiplier of the present embodiment has a protection layer 37 located at the upper face 12a, which can provide mechanical protection to the upper side of the optical waveguide 10. For example, the protection layer 37 can protect the upper side (face 12a) of the waveguide 10 against scratches or abrasions that could introduce reflections in unwanted directions leading to degradation in image quality. In addition, the reflectivity of the face 12a and the partially reflective surface 96 may cause unwanted reflections from the external scene into the eye. Therefore, in order to reduce reflections, an opaque cover member 38 (FIG. 15B) is preferably deployed to cover the waveguide 10 faces 14a, 14b and the protection layer 37. As illustrated, the cover 38 has an inverted U-shape, and includes an upper portion 38c that covers the protection layer 37 (and hence the face 12a) and a pair of legs 38a, 38b that respectively cover the faces 14a, 14b. Portions of the cover 38 at the ends of the legs 38a, 38b may also cover the upper portions of the faces 22a, 22b of the second waveguide 20. A material 41 such as a reflective coating or a layer of low index material can be applied between portions of the legs 38a, 38b and the contact portions of the waveguides 10, 20. The material 41 can also be applied between portions of the legs 38a, 38b and the side contact portions of the protection layer 37. In certain embodiments, the low index material 41 is low index optical cement, which can also be used to effectuate adhesive bonding of the cover 38 to the waveguides.

Another difference is with respect to the second optical waveguide 20, which in the illustrated embodiment has faces 24a, 24b, 26a, 26b that form a more general quadrilateral cross-section. The faces 24a and 26a are preferably orthogonal to each other and are respectively parallel to faces 12b and 16a, and the face 24a defines (together with the face 12b) the interface between the two waveguides 10, 20. The faces 24b and 26b can be orthogonal to each other, or may be at an oblique angle but still close to 90°, and respectively form obtuse and acute angles with the respective faces 26a and 24a. The optical aperture multiplier has an orientation that is diagonal to the orientation of the output image 66 (that is coupled-out by facets 28), which can provide a compact and aesthetically pleasing design of the optical aperture multiplier, and facilitates various deployment configurations in which the optical waveguide 10 is diagonally oriented relative to the eye with the distal end of the waveguide 10 (opposite the proximal end of the waveguide 10) deployed either above or below the eye. In the context of the present document, the proximal end of the waveguide 10 is the end at which the image 60 is injected (coupled) into the waveguide 10. FIGS. 16A and 16B show exemplary above-eye deployment configurations for the left eye 2L and the right eye 2R, where each eye 2L, 2R has its own optical aperture multiplier 1LA, 1RA. FIGS. 17A and 17B show exemplary below-eye deployment configurations for the left eye 2L and the right eye 2R, where each eye 2L, 2R has its own optical aperture multiplier 1LB, 1RB. Each of the optical aperture multipliers 1RA, 1LA, 1RB, 1LB is constructed and operative according to the optical aperture multiplier illustrated in FIGS. 15A and 15B, and provide a coupled-out image (e.g., image 66 in FIG. 15B) to the relevant eye. It is further noted that the right above-eye optical aperture multiplier 1RA of FIG. 16B is the optical aperture multiplier illustrated in FIG. 15A, and that the left above-eye optical aperture multiplier 1LA of FIG. 16A can be achieved by mirroring the optical aperture multiplier 1RA about the y-axis. The left and right below-eye optical aperture multipliers (1LB, 1RB) of FIGS. 17A and 17B can similarly be achieved by appropriate mirroring of the optical aperture multipliers 1RA and 1LA about one or more of the three axes. It is noted that in the below-eye deployment configurations of FIGS. 17A and 17B, the distal end of the waveguide 10 is positioned below the eye, whereas as the mid-portion and proximal end of the waveguide 10 are positioned at or above eye level. In certain non-limiting implementations, however, the geometry of either or both of the waveguides 10, 20 can be modified such that the entirety of the rectangular waveguide 10 is deployed below the eye of the user.

Figure 18A:
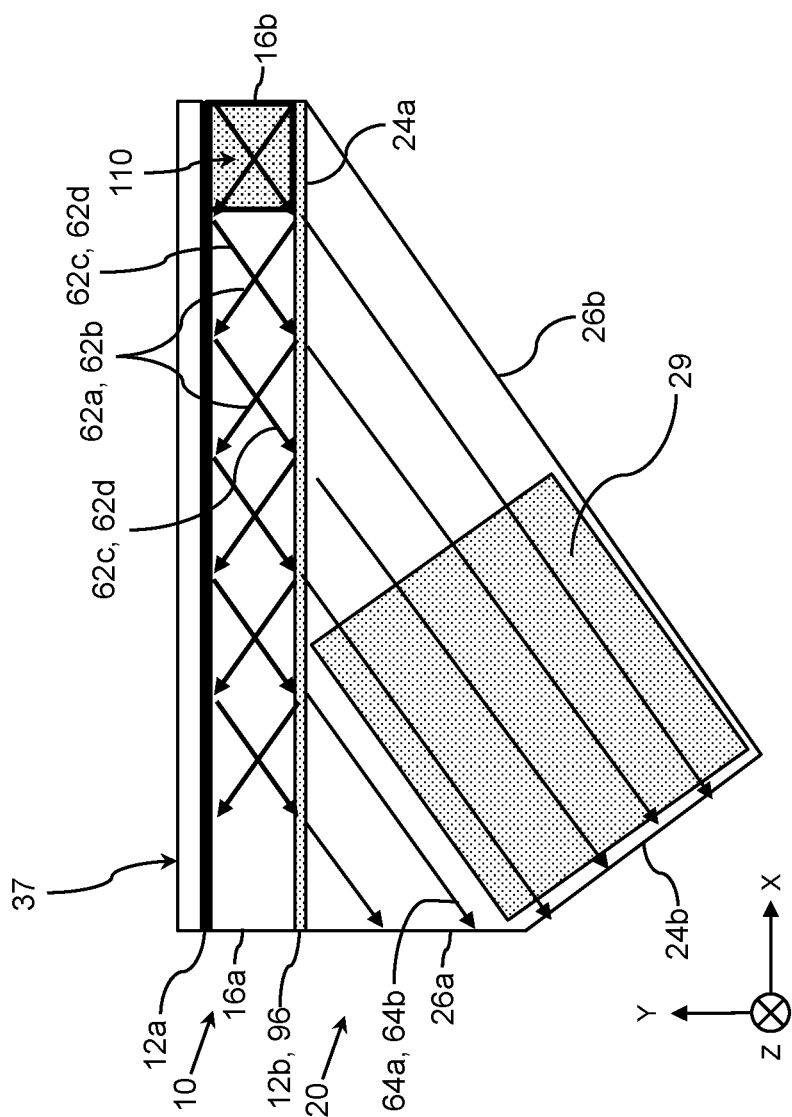
FIGS. 18A and 18B are schematic front and side views, respectively, illustrating an optical aperture multiplier, similar to the optical aperture multiplier of FIGS. 15A and 15B, but without the cover member and having diffractive coupling-in and coupling-out elements, according to an embodiment of the present invention.
Figure 18B:
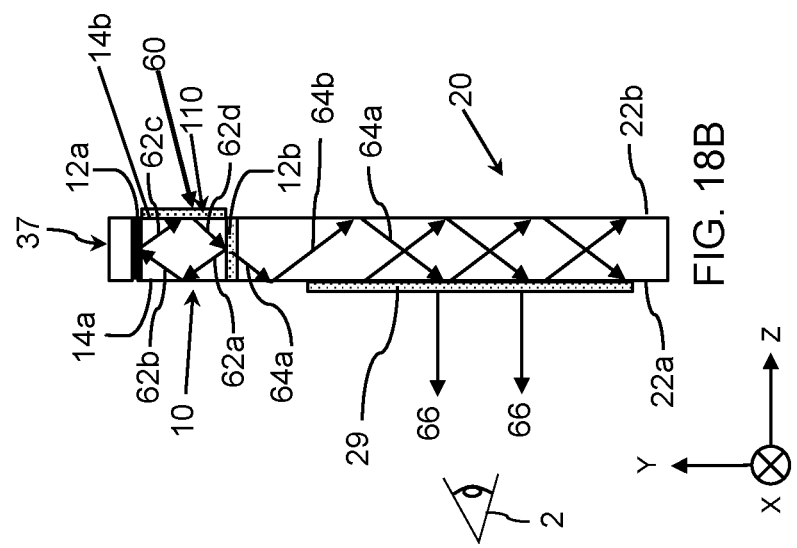

FIGS. 18A and 18B show an embodiment similar to the embodiment illustrated in FIGS. 15A and 15B, except diffractive elements are used for coupling light into the optical waveguide 10 and out of the optical waveguide 20. In particular, an optical coupling-in configuration 110, in the form of a diffractive element (e.g., diffractive grating) deployed in association with one of the faces 14b is used to couple the image 60 into the optical waveguide 10. The coupling-in diffractive element is shown as being deployed in association with the face 14b, to accommodate preferred deployment of the optical image generator at the backside of the optical aperture multiplier.

A coupling-out diffractive optical element 29, e.g., diffractive grating, is deployed in association with one of the faces 22a, 22b, and couples light 64a, 64b out of the optical waveguide 20 and toward the eye 2. Although the diffractive element is shown as being associated with the face 22a, the diffractive element can also be deployed in association with the face 22b. In addition, although a single diffractive element 29 is shown in FIGS. 18A and 18B, multiple diffractive elements can be employed, each associated with a respective portion of the face 22a or the face 22b (or respective non-overlapping portions of the faces 22a, 22b).

It is noted that in embodiments in which the optical coupling-out configuration of the optical waveguide 10 is implemented as a set of oblique facets 18, for example as in the embodiments described with reference to FIGS. 1A and 1B, the facets 28 of the optical waveguide 20 can be deployed with or without a tilt angle relative to the face 24a (i.e., oblique to the face 24a, or parallel to the face 24a and perpendicular to the face 26a) and still couple-out the full FOV image. This is due in part to the fact that the pair of conjugate images (e.g., images 62a and 62b) are deflected by the facets 18 into the optical waveguide 20. However, in embodiments in which the optical coupling-out configuration of the optical waveguide 10 is implemented as a partially reflective surface 96 that is associated with, and parallel to, the face 12b (e.g., as in FIGS. 9A-12 and FIG. 14), only the downgoing beam vector (e.g., image 62d) is coupled into the optical waveguide 20. Therefore, in order to maintain as much of the image FOV as possible, the facets 28 should have a tilt angle relative to the face 24a (or 24a). In certain cases, the tilt angle of the facets 28 may result in an increase in the size and formfactor of the optical aperture multiplier, and therefore it may be desirable to employ facets 28 without a tilt angle deployed within a thin slab-type waveguide, in combination with an optical waveguide 10 associated with a coupling-out configuration implemented as a partially reflective surface 96 in order reduce the size of the optical aperture multiplier.

FIGS. 19A and 19B illustrate an embodiment of an optical aperture having a rectangular waveguide 10 with a partially reflective surface 96 (instead of oblique facets) that is optically coupled with a second optical waveguide 20 having facets 28 without a tilt angle. The optical coupling-in configuration 100 previously described is also illustrated here, which couples the image 60 into the optical waveguide 10.

In the illustrated embodiment, the optical waveguide 20 is a thin slab-type waveguide having a pair of parallel faces 22a, 22b, and two additional pairs of faces 24a, 24b, 26a, 26b which are illustrated as pairs of parallel faces. A light redirecting arrangement 120 is associated with a first region 121 of the optical waveguide 20 and functions to redirect (deflect) the light coupled into the optical waveguide 20 toward the facets 28, which are located in a second region 122 of the optical waveguide 20.

The first region 121 preferably spans the entire length of the optical waveguide 20 between the faces 26a, 26b and occupies the upper portion of the optical waveguide 20, typically the upper 10%-25% of the optical waveguide 20, measured from the face 24a in the direction toward the face 24b (illustrated arbitrarily herein as corresponding to the "y" direction). The second region 122 also preferably spans the entire length of the optical waveguide 20 between the faces 26a, 26b. The two regions 121, 122 may be non-overlapping regions, such that the second region 122 occupies a lower portion of the optical waveguide 20 that is not occupied by the first region 121. However, in certain embodiment the two regions 121, 122 may partially overlap (along the "y" direction).

In preferred embodiments, the light redirecting arrangement 120 spans the majority or entirety of the length of the optical waveguide 20 between the faces 26a, 26b. In certain embodiments, the light redirecting arrangement 120 is implemented as a set of mutually parallel partially reflective surfaces (facets) that at least partially traverse the length of the optical waveguide 20 between the faces 26a, 26b (i.e., along the x-axis in the arbitrarily labeled xyz coordinate system) and are inclined obliquely to the faces 12b, 24a (preferably at a steep, yet acute angle). In other embodiments, the light redirecting arrangement can be implemented as one or more diffractive elements associated with one or more of the faces 22a, 22b, 24a, 24b, 26a, 26b of the optical waveguide 20.

In embodiments in which the light redirecting arrangement 120 is implemented as a set of facets 120, the facets 120 have a first orientation that is non-parallel to the orientation of the facets 28 (which are inclined obliquely to the faces 22a, 22b). In the illustrated embodiment, the two sets of the facets 120, 28 are non-overlapping, however other embodiments are possible in which one or more of the facets 28 overlaps with the facets 120 in the projection onto the plane of the faces 22a, 22b (which is the xy plane in the drawings).

The configuration of the light redirecting arrangement 120 and the facets 28 are such that, when the partially reflective surface 96 couples the image propagating through the optical waveguide 10 by four fold internal reflection (images 62a, 62, 62c, 62d) into the optical waveguide 20, the coupled-in image propagates within the first region 121 of the optical waveguide 20 by internal reflection (images 63a, 63b) at the faces 22a, 22b in a first guided direction, with a proportion of intensity of the image reflected (deflected) at the light redirecting arrangement 120 so as to be redirected into the second region 122 of the optical waveguide 20 in a second guided direction, and then propagates within the second region 122 of the optical waveguide 20 by internal reflection (images 64a, 64b) at the faces 22a, 22b, with a proportion of intensity of the image reflected (deflected) at the partially reflective surfaces 28 so as to be directed outwards from one of the parallel faces 22a as a visible image 66, seen by the eye 2 of the viewer. The first guided direction is generally diagonal to the direction of elongation of the waveguide 10 (i.e., diagonal to the faces 12b, 24a). The second guided direction is different from the first guided direction, and is preferably perpendicular or close to perpendicular to the direction of elongation of the waveguide 10 (and faces 12b, 24a), and preferably parallel or nearly parallel to the faces 26a, 26b.

FIGS. 20A and 20B show an embodiment similar to the embodiment illustrated in FIGS. 19A and 19B, except diffractive elements are used for coupling light into the optical waveguide 10 and out of the optical waveguide 20, similar to as described with reference to FIGS. 18A and 18B. In particular, the optical coupling-in configuration 110, in the form of a diffractive element (e.g., diffractive grating) deployed at one of the faces 14b is used to couple the image 60 into the optical waveguide 10. The coupling-in diffractive element is shown as being deployed in association with the face 14b, to accommodate preferred deployment of the optical image generator at the backside of the optical aperture multiplier.

A coupling-out diffractive optical element 29, e.g., diffractive grating, is deployed in association with a portion of one of the faces 22a that is in the second region 122, and couples light 64a, 64b out of the optical waveguide 20 and toward the eye 2. Although the diffractive element is shown as being associated with the face 22a, the diffractive element can also be deployed in association with a portion of the face 22b that is in the second region 122. In addition, although a single diffractive element 29 is shown in FIGS. 20A and 20B, multiple diffractive elements can be employed, each associated with a respective portion of the face 22a or the face 22b (or respective non-overlapping portions of the faces 22a, 22b) that are in the second region 122.

In all of the disclosed embodiments, the light beam 60 corresponds to light from a collimated image that is generated by an optical image generator. Although not illustrated in the accompanying drawings, the optical image generator (also referred to as an "image projector") generally includes at least one light source, typically a polarized source deployed to illuminate a spatial light modulator, such as a liquid crystal on silicon (LCoS) chip. The spatial light modulator modulates the projected intensity of each pixel of the image, thereby generating an image.

Alternatively, the image projector may include a scanning arrangement, typically implemented using a fast-scanning mirror, which scan illumination from a laser light source across an image plane of the projector while the intensity of the beam is varied synchronously with the scanning motion on a pixel-by-pixel basis, thereby projecting a desired intensity for each pixel. In both cases, collimating optics are provided to generate an output projected image (i.e., image light 60) which is collimated to infinity. Some or all of the above components of the image projector are typically arranged on surfaces of one or more polarizing beamsplitter (PBS) cubes or other prism arrangement, as is well known in the art. Thus, the collimated light 60 generated by the image projector may typically be polarized, and may have an initial polarization relative to one of the faces of the waveguide 10 upon injection into the optical waveguide 10. Optical image generators have been described in various publications by Lumus Ltd (Israel), including, for example, U.S. Pat. No. 8,643,948, US Patent Application Publication No. 2019/0391408, and US Patent Application Publication No. 2021/0072553.

The polarization scheme employed by the optical aperture multiplier in certain embodiments in which light is coupled into the optical waveguide 20 by a partially reflective surface (e.g., surface 96) associated with the face 12b instead of oblique facets deployed within the waveguide 10 is particularly relevant, and should be designed to ensure that the injected light propagates through both the 2D and 1D waveguide without degradation in image quality.

In embodiments in the which the partially reflective surface 96 is formed using a multiyear coating that has a metallic layer, there is some flexibility in terms of the polarization of the image light 60 that is injected into the waveguide 10. In particular, at the range of operating incident angles to be coupled out by the partially reflective surface 96, metallic coatings generally provide suitable partial reflectivity (and therefore partial transmissivity) for p-polarized light, and high reflectivity for s-polarized light. Thus, the partially reflective surface 96 (when formed using a metallic layer) can efficiently couple p-polarized components of propagating light out of the waveguide 10 and preserve s-polarized components within the waveguide 10. Accordingly, any suitable polarization scheme can be used to produce the light beam 60 that is to be injected into the waveguide 10.

In one example, the light beam 60 is unpolarized (thus having s-polarized and p-polarized components) with regard to the face 12b (i.e., the surface 96), such that a proportion of the intensity of the p-polarized component is transmitted out of the waveguide 10 by the partially reflective surface 96, and such that the s-polarized component is reflected by the surface 96. In certain non-limiting embodiments, the optical image generator outputs light beam 60 as an unpolarized beam by employing a particular configuration of light sources. In particular, the optical image generator can combine orthogonally polarized laser sources to produce an unpolarized image beam. In another embodiment, the optical image generator outputs a polarized image beam, but a depolarizer is deployed in the optical path between the optical image generator and the input aperture of the waveguide 10, for example either before the optical coupling-in configuration or at the output of the optical coupling-in configuration. Examples of depolarizer deployment configurations are described in detail in U.S. Pat. No. 10,133,070.

In another example, the light beam 60 can be circularly polarized with regard to the face 12b, for example by deploying a linear polarized filter and a quarter-waveplate at the output of the optical image generator (or input to the optical coupling-in configuration), or alternatively at the output of the optical coupling-in configuration.

In yet another example, the light beam 60 can be p-polarized with regard to the face 12b. This can be achieved by either employing an optical image generator that outputs p-polarized light. However, in typical configurations the optical image generator outputs s-polarized light, and therefore a waveplate can be deployed at the output of the optical image generator (or input to the optical coupling-in configuration), or alternatively at the output of the optical coupling-in configuration, to rotate the polarization of the output light from s-polarized to p-polarized.

In embodiments in the which the partially reflective surface 96 is formed using one or more dielectric coating layers, management of the polarization direction of the injected beam 60 with regard to the face 12b (partially reflective surface 96) is critical in order to achieve reasonable light efficiency. In such embodiments, the optical image generator is configured to produce polarized image illumination that is s-polarized with regard to the face 12b. The optical image generator described in U.S. Pat. No. 8,643,948 is one example of an optical image generator that produces s-polarized image light.

In certain embodiments, in order to accommodate the reflectivity of the facets 28 to ensure that the facets 28 sufficiently reflect the propagating light out of the 1D waveguide, a waveplate (such as a halfwave plate) can be deployed at the interface between the two waveguides 10 and 20. Referring again at FIGS. 15A and 15B, a waveplate 130 for rotating a polarization state of the light to be coupled into the optical waveguide 20 is optionally deployed at the interface between the waveguides 10, 20 and in association with the partially reflective surface 96. In particular, the waveplate 130 is located at the interface 40, between the partially reflective surface 96 and the upper face 24a of the waveguide 20. The waveplate 130 is of particular value when used in combination with embodiments in which the partially reflective surface 96 is formed using dielectric coatings (and the injected beam 60 is s-polarized with regard to the face 12b). In such embodiments, the illumination coupled out of the waveguide 10 by the surface 96 is s-polarized with regard to the surface 96/face 12b. However, the facets 28 are typically formed using optical coatings that have designed reflectivity for light that is s-polarized with regard to the faces 22a, 22b, which are orthogonal to the face 12b. Thus, the polarization direction of the light that is coupled out from the waveguide 10 is p-polarized with regard to the faces 22a, 22b. By deploying the waveplate 130 between the waveguides 10, 20, the waveplate 130 rotates the polarization direction of the coupled-out light to be s-polarized with regard to the faces 22a, 22b, which increases the efficiency of light coupled out by the facets 28.

As should be apparent, the waveplate 130 can be deployed in a similar location between the partially reflective surface 96 and the upper face 24a of the waveguide 20 in the embodiments illustrated in FIGS. 18A-20B.

The following paragraphs describe some of the design aspects of the dielectric coating that can be used to form the partially reflective surface 96, with reference to FIGS. 21 and 22. Initially, the coating should be optimally designed to achieve maximal power (intensity) of the beam that propagates at the far end of the waveguide 20 while at the same time achieving the same power (intensity) for the beam reflected at the near end of the waveguide 20. The "far end" of the waveguide 20 is generally the region of the face 26a that is close to the face 24b, and the "near end" of the waveguide 20 is generally the region of the face 24b that is close to the face 26b. In FIG. 21, the beam propagating at the far end of the waveguide 20 is shown as a solid arrow, and can be traced back through the first waveguide 10 to light ray 60F at the input to the optical coupling-in configuration 100. The beam propagating at the near end of the waveguide 20 is shown as a dashed arrow, and can be traced back to light ray 60N at the input to the optical coupling-in configuration 100.

By way of one example, if the reflectivity provided by the coating such that the beam at the far end exits the waveguide 20 at the desired angle is denoted by R, and the number of reflections within the waveguide 10 is denoted by N, and the transmittance between two reflections is denoted by T, then the power output of the beam corresponding to injected beam 60F at the far side of the waveguide 20 can be expressed as:

$$P=(1-R)(R*T)^N.$$

As should be apparent, the power P is a multivariable function, and can be maximized in various ways, including, for example, by fixing T and N, and then maximizing P and identifying the value of R that maximizes P. For example, if T=0.98 and N=8, then P achieves a maximum value $P_{max}$ of approximately 0.0367 when R≈0.88. In general, the reflectivity of the coating for the light corresponding to 60N at the entrance to the waveguide 10 should be $1-P_{max}$, which in the present example in which $P_{max}$=0.0367 yields a reflectivity of approximately 0.9633 (96.33%).

FIG. 22 illustrates a graph of the reflectivity of s-polarized light as a function of AOI. As can be seen from the graph, and continuing with the present example in which $P_{max}$=0.0367, s-polarized light achieves the desired reflectivity of approximately 96.33% (in contrast to the reflectivity of p-polarized light which dives sharply close to Brewster's angle). Thus, for the particular example in which $P_{max}$=0.0367, injecting a beam that is s-polarized with regard to the face 12b will achieve optimal and uniform illumination. In such a polarization scheme, and using the example reflectivity above, the reflectivity of the partially reflective surface 96 for the s-polarized beam 60F will be approximately 88%, and the reflectivity of the partially reflective surface 96 for the s-polarized beam 60N will be approximately 96.33%.

Although embodiments according to the second aspect have thus far been described within the context of the waveguides 10, 20 being optically coupled at the faces 12b, 24a, other embodiments are possible in which the optical waveguide 10 is deployed such that the optical coupling is between the face 12b and a portion of one of the parallel faces 22a, 22b. In such embodiments the face 22a (or 22b)

acts as the input coupling surface to the waveguide 20. A simplified isometric representation of such an embodiment is illustrated in FIG. 23, which shows the waveguides 10, 20 coupled together at the faces 12b, 22a. An intermediate refractive layer 99 is deployed between the faces 12b, 22a through which the image that is coupled out from the waveguide 10 passes before being coupled into the waveguide 20 through the face 22a. The beam that is introduced into the waveguide 10 should be reflected by the interface with the refractive layer 99, and the light beams propagating by internal reflection through the waveguide 10 should be coupled out (either by facets 18 or partially reflective surface 96) through the refractive layer 99 into the waveguide 20 via the face 22a. Further details of the refractive layer can be found in U.S. Pat. No. 10,133,070.

The following paragraphs describe various methods for fabricating optical aperture multipliers according to embodiments of the present invention, in particular some of the optical aperture multipliers described with reference to FIGS. 9A-12.

As shown in FIG. 24A, a plurality of LOEs (i.e., second optical waveguides) 20 is obtained. Each LOE 20 is as described above, for example with reference to FIGS. 1A and 1B, and has a pair of major parallel faces 22a, 22b (which may be formed on cover plates 39a, 39b), and a plurality of mutually parallel partially reflective internal surfaces (facets) oblique to the faces 22a, 22b. It is noted, however, that in certain embodiments each LOE 20 may be formed without cover plates, for example as illustrated in FIG. 1C. Each LOE 20 also includes another two pairs of faces 24a, 24b, 26a, 26b (each of which may or may not be a pair of parallel faces), and a plurality of partially reflective internal surfaces (facets) oblique to the faces 22a, 22b. For clarity, the internal facets of the LOEs are not depicted in FIGS. 24A-24F, but the deployment of the internal facets in the LOEs can be well understood from other drawings accompanying this description.

Techniques suitable for fabrication of each LOE 20 are generally known, and may be found, for example, in commonly owned prior U.S. Pat. No. 8,432,614, as described there with reference to FIGS. 18-23.

The plurality of LOEs 20 is aligned and then arranged in a stack and bonded together such that the cover plates 39a, 39b of adjacent LOEs are joined together. FIG. 24B shows the resulting bonded stack 200 of aligned LOEs 20, which has three pairs of faces 222a, 222b, 224a, 224b, 226a, 226b. The faces 222a, 222b are a pair of parallel faces, and the other two pairs of faces may or may not be pairs of parallel faces. In certain embodiments, the three pairs of faces of the bonded stack 200 are mutually orthogonal (perpendicular). The alignment of the LOEs 20 is such that the faces 22a, 22b of all of the LOEs 20 are mutually parallel (parallel to the xy plane). The face 22a of the LOE at one end of the stack actually forms the face 222a, and the face 22 of the LOE at the other end of the stack forms the face 222b. In embodiments in which each of the pairs of faces 224a, 224b and 226a, 226b is a pair of parallel faces, the alignment of the LOEs 20 is further such that the faces 24a of the LOEs 20 are coplanar (and parallel to the xz plane) and the faces 24b of the LOEs 20 are coplanar (and parallel to the xz plane) such that the faces 24a and 24b of the aligned LOEs 20 respectively form the faces 224a and 224b (which are parallel to the xz plane) of the bonded stack 200, and the faces 26a of the LOEs 20 are coplanar (and parallel to the yz plane) and the faces 26b of the LOEs 20 are coplanar (and parallel to the yz plane) such that the faces 26a and 26b of the aligned LOEs 20 respectively form the faces 226a and 226b (which are parallel to the yz plane) of the bonded stack 200. In embodiments in which each of the pairs of faces 222a, 222b and 224a, 224b is a pair of parallel faces, each of the pairs of faces 222a, 222b and 224a, 224b is orthogonal (perpendicular) to the faces 22a, 22b of each of the LOEs 20 (and thus orthogonal to the faces 222a, 222b of the stack 200).

As illustrated in FIG. 24C, a coated transparent thick plate 300 having three pairs of faces 312a, 312b, 314a, 314b, 316a, 316b is obtained. Each of the pairs of faces 312a, 312b and 314a, 314b is a pair of parallel faces, and the two pairs of parallel faces 312a, 312b, 314a, 314b together form a rectangular cross-section (in the yz plane). The pair of faces 316a, 316b may or may not be a pair of parallel faces. In certain embodiments, the lower face 312b is coated with a selectively reflective coating (e.g., metallic coating with or without dielectric layer), such that the coated face 312b becomes a partially reflective surface. In other embodiments, a thin plate coated with a selectively reflective coating is aligned with, and bonded to, the face 312b. In yet other embodiments, a thin film of partially reflective material is attached to the face 312b. In all such embodiments, the coating or material is deployed on the face 312b such that the coating or material extends along the entire width of the face 312b (in the "z" direction). In certain embodiments, the coating or material is deployed on the face 312b such that the coating or material extends along the entire length of the face 312b (in the "x" direction). Such embodiments are particularly suitable when the final waveguide structure is to be used with an optical coupling-in configuration that provides side illumination (such as the coupling prism 100 of FIG. 15A). In other embodiments, the coating or material is deployed on the face 312b such that the coating or material extends along the majority, but not the entirety, of the length of the face 312b. Such embodiments are particularly suitable when the final waveguide structure is to be used with a "bottom-up" optical coupling-in configuration that provides front/back illumination (such as the optical coupling-in configurations of FIGS. 3-5, 7A, and 7B).

In other embodiments, a metallic coating is applied so as to extend along the entire width of the face 312a (in the "z" direction) and along the majority (but not the entirety) of the length of the face 312a (in the "x" direction). Such embodiments are particularly suitable when the final waveguide structure is to be used with a "top-down" optical coupling-in configuration (such as the optical coupling-in configuration of FIGS. 6A and 6B).

In FIG. 24D, the coated transparent plate 300 is aligned with the bonded stack 200 of aligned LOEs 20.

With reference to the arbitrarily labeled xyz coordinate system used in the drawings, the alignment of the coated transparent plate 300 and the bonded stack 200 (in embodiments in which each of the transparent plate 300 and the bonded stack 200 have three pairs of parallel faces) can best be understood as follows: each of the faces 312a, 312b, 224a, 224b is parallel to the xz plane, each of the faces 214a, 222a is parallel to the xy plane and preferably are coplanar, each of the faces 314b, 222b is parallel to the xy plane and preferably are coplanar, each of the faces 316a, 226a is parallel to the yz plane and preferably are coplanar, and each of the faces 316b, 226b is parallel to the yz plane and preferably are coplanar.

The bonded stack 200 is optically coupled with the coated transparent plate 300, thereby forming an optical block 280, as illustrated in FIG. 24E, while maintaining the alignment of the coated transparent plate 300 and the bonded stack 200 described in the previous paragraph. The bonded stack 200 is optically coupled with the coated transparent plate 300 to form an interface 240 between the faces 312b and 224a (i.e., such that the faces 312b, 224a are in facing relation with each other). The interface 240 includes the coating or material applied or otherwise associated with the face 312b as discussed above. Alternatively, the materials or coatings can be applied to the face 224a instead of the face 312b prior to optically coupling the bonded stack 200 with the coated transparent plate 300.

Optionally, the face 312a may be coated with a reflective coating, such as a metallic coating, in order to ensure that the upper and lower faces 312a, 312b reflect propagating light at the same angles of incidence. The coating can be applied to the face 312a before or after optically coupling of the coated transparent plate 300 with the bonded stack 200.

As shown in FIG. 24E, the optical block 280 is cut along at least two parallel cutting planes (indicated by dashed lines 245 in FIG. 24E) to slice out from the optical block 280 at least one optical aperture multiplier (a single optical aperture multiplier is shown in FIG. 24F, but multiple such optical aperture multipliers can be sliced-out of the optical block 280).

The cutting planes 245 are parallel to the parallel faces 22a, 22b of consecutive LOEs 20 of the bonded stack 200 and parallel to the faces 314a, 314b of the coated transparent plate 300. The cutting planes 245 are thus orthogonal to the faces 312a, 312b of the transparent plate 300.

Each sliced-out optical aperture multiplier has a rectangular optical waveguide 10 (2D optical waveguide) optically coupled with an LOE 20 (1D optical waveguide) at interface 40, and has a partially reflective surface at the interface 40 that is associated with the coupling surface (face 12b in FIGS. 9A-12) of the waveguide 10. In embodiments in which each of the LOEs 20 includes a pair of cover plates 39a, 39b, each of the cutting planes 245 preferably passes between consecutive (i.e., adjacent) cover plates 39a, 39b. In embodiments in which the LOEs 20 do not include any cover plates (as in FIG. 1C), each of the cutting planes 245 is preferably located at the bonding region between adjacent major external surfaces (faces) of consecutive LOE substrates 19.

In the above-described fabrication methods, the cutting or slicing of the various optical structures described herein can be performed by any suitable cutting apparatus/device/tool, as should be understood by those of ordinary skill in the art. In certain embodiments, some or all of the surfaces/faces of the optical structures that are produced as of these cutting/slicing steps can be polished. The polishing of the faces and surfaces of the various optical structures described herein can be performed by any suitable polishing apparatus/device/tool, as should be understood by those of ordinary skill in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical aperture multiplier comprising:
a first optical waveguide having a first pair of parallel faces including a first face and a second face, and a second pair of parallel faces including a third face and a fourth face, the pairs of parallel faces together forming a rectangular cross-section, the first optical waveguide configured for guiding light by four-fold internal reflection at the pairs of parallel faces and being associated with an coupling-out configuration that couples light out of the first optical waveguide into a second optical waveguide that is optically coupled with the first optical waveguide, wherein the first or second face is subdivided into a first region and a second region having respectively different optical characteristics; and
an optical coupling-in configuration including a surface that transmits light into the first waveguide, the surface being deployed in association with a portion of the third or fourth face that adjoins the second region such that an edge associated with the surface trims an input collimated image in a first dimension and a boundary between the first and second regions trims the input collimated image in a second dimension to produce a trimmed collimated image that advances through the first optical waveguide by four-fold internal reflection.

2. The optical aperture multiplier of claim 1, wherein the boundary between the first and second regions together with an image of the boundary presents an apparent input optical aperture when viewed along an optical input axis.

3. The optical aperture multiplier of claim 1, wherein some of the input collimated image is reflected at a point on the first face that intersects with or is overlapped by the edge.

4. The optical aperture multiplier of claim 1, wherein the edge is a first edge of the surface, and wherein the surface includes a second edge that is a common edge with a light entrance surface that receives the input collimated image from an optical image generator.

5. The optical aperture multiplier of claim 4, wherein the edge is parallel to the light entrance surface.

6. The optical aperture multiplier of claim 4, wherein the edge is non-parallel to the light entrance surface.

7. The optical aperture multiplier of claim 1, wherein the surface receives the input collimated image from an optical image generator, and wherein the edge is a first edge of the surface, and wherein the surface includes a second edge that is a common edge with a reflective surface that reflects the received input collimated image back to the surface so as to be trimmed by the edge.

8. The optical aperture multiplier of claim 1, further comprising: the second optical waveguide, wherein the second optical waveguide has a third pair of parallel faces and is configured to guide light by internal reflection at the third pair of parallel faces, and wherein the second optical waveguide includes a plurality of partially reflective surfaces between, and oblique to, the third pair of parallel faces, that couples light out of the second optical waveguide.

9. The optical aperture multiplier of claim 8, wherein a coating or material is deployed in association with the second face so as to subdivide the first face into the first and second regions.

10. The optical aperture multiplier of claim 8, further comprising: an optical substrate including a fifth face and optically coupled with the first optical waveguide at the first face, and wherein a coating or material is associated with the first face so as to subdivide the first face into the first and second regions.

11. The optical aperture multiplier of claim 1, wherein the optical coupling-out configuration includes a plurality of partially reflective surfaces that at least partially traverse the first optical waveguide and are inclined obliquely to a direction of elongation of the first optical waveguide.

12. The optical aperture multiplier of claim 1, wherein the optical coupling-out configuration includes a partially reflective surface associated with the second face.

13. An optical aperture multiplier comprising:
a first optical waveguide having a first pair of parallel faces including a first face and a second face, and a second pair of parallel faces including a third face and a fourth face, the pairs of parallel faces together forming a rectangular cross-section, wherein a partially reflective surface is associated with, and is parallel to, the second face; and
a second optical waveguide having a plurality of faces including a third pair of parallel faces, the second optical waveguide being optically coupled with the first optical waveguide at an interface between the second face and one of the faces of the second optical waveguide, wherein a light redirecting arrangement is associated with a first region of the second optical waveguide and an optical coupling-out configuration is associated with a second region of the second optical waveguide,
wherein the optical coupling, the partially reflective surface, the light redirecting arrangement, and the optical coupling-out configuration are configured such that, when light corresponding to an image is coupled into the first optical waveguide the light advances by four-fold internal reflection along the first optical waveguide, with a proportion of intensity of the light transmitted at the partially reflective surface so as to be coupled into the first region of the second optical waveguide, and propagates within the first region of the second optical waveguide by internal reflection at the third pair of parallel faces, with a proportion of intensity of the light deflected by the light redirecting arrangement so as to be redirected into the second region of the optical waveguide, and propagates within the second region of the second optical waveguide by internal reflection at the third pair of parallel faces, with a proportion of intensity of the light propagating within the second region of the second optical waveguide deflected out of the second optical waveguide by the optical coupling-out configuration.

14. The optical aperture multiplier of claim 13, wherein the optical coupling-out configuration includes a plurality of partially reflective surfaces deployed within the second optical waveguide oblique to the third pair of parallel faces.

15. The optical aperture multiplier of claim 13, wherein the optical coupling-out configuration includes a diffractive optical element associated with at least one of the faces of the third pair of parallel faces.

16. The optical aperture multiplier of claim 13, wherein the light redirecting arrangement includes a plurality of partially reflective surfaces deployed within the first region of the second optical waveguide oblique to the additional face.

17. The optical aperture multiplier of claim 13, wherein the light redirecting arrangement includes a diffractive optical element associated with one of the faces of the second optical waveguide.

* * * * *